US009420272B2

(12) United States Patent
Tsuruga et al.

(10) Patent No.: US 9,420,272 B2
(45) Date of Patent: *Aug. 16, 2016

(54) DIGITAL CONTENTS RECEIVER, DIGITAL CONTENTS RECEIVING METHOD AND DIGITAL CONTENTS TRANSMITTING AND RECEIVING METHOD

(71) Applicant: HITACHI MAXELL, LTD., Osaka (JP)

(72) Inventors: Sadao Tsuruga, Yokohama (JP); Satoshi Otsuka, Yokohama (JP)

(73) Assignee: HITACHI MAXELL, LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/804,668

(22) Filed: Jul. 21, 2015

(65) Prior Publication Data

US 2015/0326851 A1 Nov. 12, 2015

Related U.S. Application Data

(63) Continuation of application No. 13/089,519, filed on Apr. 19, 2011, now Pat. No. 9,118,896.

(30) Foreign Application Priority Data

Apr. 21, 2010 (JP) .................................. 2010-097498
Apr. 21, 2010 (JP) .................................. 2010-097499

(51) Int. Cl.
*H04N 13/04* (2006.01)
*H04N 13/00* (2006.01)

(52) U.S. Cl.
CPC ....... *H04N 13/0454* (2013.01); *H04N 13/0051* (2013.01); *H04N 13/0059* (2013.01); *H04N 13/0066* (2013.01); *H04N 13/0429* (2013.01); *H04N 13/0452* (2013.01); *H04N 13/0497* (2013.01); *H04N 13/0402* (2013.01)

(58) Field of Classification Search
None
See application file for complete search history.

(56) References Cited

U.S. PATENT DOCUMENTS 9,118,896 B2 * 8/2015 Tsuruga ............. H04N 13/0051
2006/0279750 A1 12/2006 Ha
(Continued)

FOREIGN PATENT DOCUMENTS

CN 1882106 A 12/2006
CN 101123734 B 12/2013
(Continued)

OTHER PUBLICATIONS

Chinese Office Action for Chinese Application No. 20111010568.8, issued on Oct. 11, 2014.
(Continued)

*Primary Examiner* — Andy Rao
*Assistant Examiner* — Tyler Edwards
(74) *Attorney, Agent, or Firm* — Baker Botts L.L.P.

(57) ABSTRACT

In a digital contents receiver for receiving transmitted digital contents, the digital contents include at least component information indicating an element which constitutes a program of the contents. When the component information indicates that the received digital contents are a 3D component, it is determined whether a display part corresponds to display of the 3D component. If the display part corresponds to display of the 3D component, the received digital contents are displayed in 3D.

5 Claims, 38 Drawing Sheets

(56) References Cited

U.S. PATENT DOCUMENTS

| | | |
|---|---|---|
| 2007/0242068 A1 | 10/2007 | Han et al. |
| 2008/0303832 A1 | 12/2008 | Kim et al. |
| 2009/0220213 A1 | 9/2009 | Ogawa et al. |
| 2009/0310016 A1 | 12/2009 | Fukuda et al. |
| 2010/0045780 A1 | 2/2010 | Kwon et al. |
| 2010/0074594 A1 | 3/2010 | Nakamura et al. |
| 2011/0043614 A1 | 2/2011 | Kitazato |
| 2011/0221871 A1 | 9/2011 | Sakaniwa et al. |

FOREIGN PATENT DOCUMENTS

| | | |
|---|---|---|
| JP | 2003-009033 A | 1/2003 |
| JP | 2003-333624 A | 11/2003 |
| JP | 2005-006114 A | 1/2005 |
| JP | 2008-067109 A | 3/2008 |
| JP | 2009-135646 A | 6/2009 |
| JP | 2011-066871 A | 3/2011 |
| WO | WO 2010/041896 A2 | 4/2010 |

OTHER PUBLICATIONS

JP Search Report/Office Action for Japanese Application No. 2010-097499, issued on Sep. 3, 2013.
Office Action, mailed May 7, 2015, which issued during the prosecution of Japanese Patent Application No. 2014-045845, which corresponds to the present application (Full English translation attached).
Office Action, mailed May 31, 2016, which issued during the prosecution of Japanese Patent Application No. 2015-059742, which corresponds to the present application.

* cited by examiner

FIG.3

| STREAM FORM TYPE | MEANING |
|---|---|
| 0x00 | UNDEFINED |
| 0x01 | ISO/IEC 11172-2 VIDEO (MPEG1 VIDEO) |
| 0x02 | ITU-T RECOMMENDATIONS H. 262 I ISO/IEC 13818-2 VIDEO OR ISO/IEC 11172-2 RESTRAINT PARAMETER VIDEO STREAM |
| 0x03 | ISO/IEC 11172-3 AUDIO |
| 0x04 | ISO/IEC 13818-3 AUDIO |
| 0x05 | ITU-T RECOMMENDATIONS H. 222.0I I ISO/IEC 13818-1 PRIVATE SECTION |
| 0x06 | ITU-T RECOMMENDATIONS H. 222.0I I ISO/IEC 13818-1 PES PACKET ACCOMMODATING PRIVATE DATA] |
| 0x07 | ISO/IEC 13522 MHEG |
| 0x08 | ITU-T RECOMMENDATIONS H. 222.0I I ISO/IEC 13818-1 ANNEX A DSM-CC |
| 0x09 | ITU-T RECOMMENDATIONS H. 222.1 |
| 0x0A | ISO/IEC 13818-6 (TYPE A) |
| 0x0B | ISO/IEC 13818-6 (TYPE B) |
| 0x0C | ISO/IEC 13818-6 (TYPE C) |
| 0x0D | ISO/IEC 13818-6 (TYPE D) (DATA CARROUSEL) |
| 0x0E | DATA TYPE PRESCRIBED IN ITU-T RECOMMENDATIONS H. 222.0I I ISO/IEC 13818-1 OTHER THAN THE ABOVE-DESCRIBED RECOMMENDATIONS |
| 0x0F | ISO/IEC 13818-7 AUDIO (ADTS TRANSPORT STRUCTURE) (MPEG2 AAC) |
| 0x10 | ISO/IEC 14496-2 VIDEO |
| 0x11 | ISO/IEC 14496-3 AUDIO (LATM TRANSPORT STRUCTURE PRESCRIBED BY ISO/IEC 14496-3 / AMD 1) |
| 0x12 | ISO/IEC 14496-1 SL PACKETIZED STREAM OR FLEX MAX STREAM TRANSMITTED IN PES PACKET |
| 0x13 | ISO/IEC 14496-1 SL PACKETIZED STREAM OR FLEX MAX STREAM TRANSMITTED IN ISO/IEC 14496 SECTION |
| 0x14 | ISO/IEC 13818-6 SYNCHRONOUS DOWNLOAD PROTOCOL |
| 0x15 | META DATA TRANSMITTED IN PES PACKET |
| 0x16 | META DATA TRANSMITTED IN META DATA SECTION |
| 0x17 | META DATA TRANSMITTED IN ISO/IEC 13818-6 DATA CARROUSEL |
| 0x18 | META DATA TRANSMITTED IN ISO/IEC 13818-6 OBJECT CARROUSEL |
| 0x19 | META DATA TRANSMITTED IN ISO/IEC 13818-6 SYNCHRONOUS DOWNLOAD PROTOCOL |
| 0x1A | IPMP STREAM (MPEG-2 IPMP PRESCRIBED IN ISO/IEC 13818-11 |
| 0x1B | AVC VIDEO STREAM PRESCRIBED BY ITU-T RECOMMENDATIONS H. 264I I ISO/IEC 14496-10 VIDEO |
| 0x1C | ISO/IEC 14496-3 AUDIO (WHICH DOES NOT USE ANY ADDITIONAL TRANSPORT STRUCTURES, SUCH AS DST, ALS, OR SLS) |
| 0x1D | ISO/IEC 14496-17 TEXT |
| 0x1E | AUXILIARY VIDEO STREAM PRESCRIBED BY ISO/IEC 23002-3 |
| 0x1F | MVC VIDEO STREAM PRESCRIBED BY ITU-T RECOMMENDATIONS H. 264I I ISO/IEC 14496 VIDEO |
| 0x20-0x7E | UNDEFINED |
| 0x7F | IPMP STREAM |
| 0x80-0xFF | USER AREA |

FIG.4

| DATA STRUCTURE | NUMBER OF BITS | BIT STRING REPRESENTATION |
|---|---|---|
| component_descriptor () { | | |
|     descriptor_tag | 8 | uimsbf |
|     descriptor_length | 8 | uimsbf |
|     reserved_future_use | 4 | bslbf |
|     stream_content | 4 | uimsbf |
|     component_type | 8 | uimsbf |
|     component_tag | 8 | uimsbf |
|     ISO_639_language_code | 24 | bslbf |
|     for (i=0;i<N;i++){ | | |
|         text_char | 8 | uimsbf |
|     } | | |
| } | | |

FIG.5A

| COMPONENT CONTENTS | COMPONENT TYPE | DESCRIPTION |
|---|---|---|
| 0x00 | 0x00-0xFF | RESERVED FOR FUTURE USE |
| 0x01 | 0x00 | RESERVED FOR FUTURE USE |
| 0x01 | 0x01 | VIDEO 480i (525i), ASPECT RATIO 4:3 |
| 0x01 | 0x02 | VIDEO 480i (525i), ASPECT RATIO 16:9, WITH PAN VECTOR |
| 0x01 | 0x03 | VIDEO 480i (525i), ASPECT RATIO 16:9, WITHOUT PAN VECTOR |
| 0x01 | 0x04 | VIDEO 480i (525i), ASPECT RATIO > 16:9 |
| 0x01 | 0x05-0x90 | RESERVED FOR FUTURE USE |
| 0x01 | 0x91 | VIDEO 2160p, ASPECT RATIO 4:3 |
| 0x01 | 0x92 | VIDEO 2160p, ASPECT RATIO 16:9, WITH PAN VECTOR |
| 0x01 | 0x93 | VIDEO 2160p, ASPECT RATIO 16:9, WITHOUT PAN VECTOR |
| 0x01 | 0x94 | VIDEO 2160p, ASPECT RATIO > 16:9 |
| 0x01 | 0x95-0xA0 | RESERVED FOR FUTURE USE |
| 0x01 | 0xA1 | VIDEO 480p (525p), ASPECT RATIO 4:3 |
| 0x01 | 0xA2 | VIDEO 480p (525p), ASPECT RATIO 16:9, WITH PAN VECTOR |
| 0x01 | 0xA3 | VIDEO 480p (525p), ASPECT RATIO 16:9, WITHOUT PAN VECTOR |
| 0x01 | 0xA4 | VIDEO 480p (525p), ASPECT RATIO > 16:9 |
| 0x01 | 0xA5-0xB0 | RESERVED FOR FUTURE USE |
| 0x01 | 0xB1 | VIDEO 1080i (1125i), ASPECT RATIO 4:3 |
| 0x01 | 0xB2 | VIDEO 1080i (1125i), ASPECT RATIO 16:9, WITH PAN VECTOR |
| 0x01 | 0xB3 | VIDEO 1080i (1125i), ASPECT RATIO 16:9, WITHOUT PAN VECTOR |
| 0x01 | 0xB4 | VIDEO 1080i (1125i), ASPECT RATIO > 16:9 |
| 0x01 | 0xB5-0xC0 | RESERVED FOR FUTURE USE |
| 0x01 | 0xC1 | VIDEO 720p (750p), ASPECT RATIO 4:3 |
| 0x01 | 0xC2 | VIDEO 720p (750p), ASPECT RATIO 16:9, WITH PAN VECTOR |
| 0x01 | 0xC3 | VIDEO 720p (750p), ASPECT RATIO 16:9, WITHOUT PAN VECTOR |
| 0x01 | 0xC4 | VIDEO 720p (750p), ASPECT RATIO > 16:9 |
| 0x01 | 0xC5-0xD0 | RESERVED FOR FUTURE USE |
| 0x01 | 0xD1 | VIDEO 240p, ASPECT RATIO 4:3 |
| 0x01 | 0xD2 | VIDEO 240p, ASPECT RATIO 16:9, WITH PAN VECTOR |
| 0x01 | 0xD3 | VIDEO 240p, ASPECT RATIO 16:9, WITHOUT PAN VECTOR |
| 0x01 | 0xD4 | VIDEO 240p, ASPECT RATIO > 16:9 |
| 0x01 | 0xD5-0xE0 | RESERVED FOR FUTURE USE |
| 0x01 | 0xE1 | VIDEO 1080p (1125p), ASPECT RATIO 4:3 |
| 0x01 | 0xE2 | VIDEO 1080p (1125p), ASPECT RATIO 16:9, WITH PAN VECTOR |
| 0x01 | 0xE3 | VIDEO 1080p (1125p), ASPECT RATIO 16:9, WITHOUT PAN VECTOR |
| 0x01 | 0xE4 | VIDEO 1080p (1125p), ASPECT RATIO > 16:9 |
| 0x01 | 0xE5-0xFF | RESERVED FOR FUTURE USE |

FIG.5B

| COMPONENT CONTENTS | COMPONENT TYPE | DESCRIPTION |
|---|---|---|
| 0x05 | 0x00 | RESERVED FOR FUTURE USE |
| 0x05 | 0x01 | H.264 | MPEG-4 AVC, VIDEO 480i (525i), ASPECT RATIO 4:3 |
| 0x05 | 0x02 | H.264 | MPEG-4 AVC, VIDEO 480i (525i), ASPECT RATIO 16:9, WITH PAN VECTOR |
| 0x05 | 0x03 | H.264 | MPEG-4 AVC, VIDEO 480i (525i), ASPECT RATIO 16:9, WITHOUT PAN VECTOR |
| 0x05 | 0x04 | H.264 | MPEG-4 AVC, VIDEO 480i (525i), ASPECT RATIO > 16:9 |
| 0x05 | 0x05-0x90 | RESERVED FOR FUTURE USE |
| 0x05 | 0x91 | H.264 | MPEG-4 AVC, VIDEO 2160p, ASPECT RATIO 4:3 |
| 0x05 | 0x92 | H.264 | MPEG-4 AVC, VIDEO 2160p, ASPECT RATIO 16:9, WITH PAN VECTOR |
| 0x05 | 0x93 | H.264 | MPEG-4 AVC, VIDEO 2160p, ASPECT RATIO 16:9, WITHOUT PAN VECTOR |
| 0x05 | 0x94 | H.264 | MPEG-4 AVC, VIDEO 2160p, ASPECT RATIO > 16:9 |
| 0x05 | 0x95-0xA0 | RESERVED FOR FUTURE USE |
| 0x05 | 0xA1 | H.264 | MPEG-4 AVC, VIDEO 480p (525p), ASPECT RATIO 4:3 |
| 0x05 | 0xA2 | H.264 | MPEG-4 AVC, VIDEO 480p (525p), ASPECT RATIO 16:9, WITH PAN VECTOR |
| 0x05 | 0xA3 | H.264 | MPEG-4 AVC, VIDEO 480p (525p), ASPECT RATIO 16:9, WITHOUT PAN VECTOR |
| 0x05 | 0xA4 | H.264 | MPEG-4 AVC, VIDEO 480p (525p), ASPECT RATIO > 16:9 |
| 0x05 | 0xA5-0xB0 | RESERVED FOR FUTURE USE |
| 0x05 | 0xB1 | H.264 | MPEG-4 AVC, VIDEO 1080i (1125i), ASPECT RATIO 4:3 |
| 0x05 | 0xB2 | H.264 | MPEG-4 AVC, VIDEO 1080i (1125i), ASPECT RATIO 16:9, WITH PAN VECTOR |
| 0x05 | 0xB3 | H.264 | MPEG-4 AVC, VIDEO 1080i (1125i), ASPECT RATIO 16:9, WITHOUT PAN VECTOR |
| 0x05 | 0xB4 | H.264 | MPEG-4 AVC, VIDEO 1080i (1125i), ASPECT RATIO > 16:9 |
| 0x05 | 0xB5-0xC0 | RESERVED FOR FUTURE USE |
| 0x05 | 0xC1 | H.264 | MPEG-4 AVC, VIDEO 720p (750p), ASPECT RATIO 4:3 |
| 0x05 | 0xC2 | H.264 | MPEG-4 AVC, VIDEO 720p (750p), ASPECT RATIO 16:9, WITH PAN VECTOR |
| 0x05 | 0xC3 | H.264 | MPEG-4 AVC, VIDEO 720p (750p), ASPECT RATIO 16:9, WITHOUT PAN VECTOR |
| 0x05 | 0xC4 | H.264 | MPEG-4 AVC, VIDEO 720p (750p), ASPECT RATIO > 16:9 |
| 0x05 | 0xC5-0xD0 | RESERVED FOR FUTURE USE |
| 0x05 | 0xD1 | H.264 | MPEG-4 AVC, VIDEO 240p, ASPECT RATIO 4:3 |
| 0x05 | 0xD2 | H.264 | MPEG-4 AVC, VIDEO 240p, ASPECT RATIO 16:9, WITH PAN VECTOR |
| 0x05 | 0xD3 | H.264 | MPEG-4 AVC, VIDEO 240p, ASPECT RATIO 16:9, WITHOUT PAN VECTOR |
| 0x05 | 0xD4 | H.264 | MPEG-4 AVC, VIDEO 240p, ASPECT RATIO > 16:9 |
| 0x05 | 0xD5-0xE0 | RESERVED FOR FUTURE USE |
| 0x05 | 0xE1 | H.264 | MPEG-4 AVC, VIDEO 1080p (1125p), ASPECT RATIO 4:3 |
| 0x05 | 0xE2 | H.264 | MPEG-4 AVC, VIDEO 1080p (1125p), ASPECT RATIO 16:9, WITH PAN VECTOR |
| 0x05 | 0xE3 | H.264 | MPEG-4 AVC, VIDEO 1080p (1125p), ASPECT RATIO 16:9, WITHOUT PAN VECTOR |
| 0x05 | 0xE4 | H.264 | MPEG-4 AVC, VIDEO 1080p (1125p), ASPECT RATIO > 16:9 |
| 0x05 | 0xE5-0xFF | RESERVED FOR FUTURE USE |

FIG.5C

| COMPONENT CONTENTS | COMPONENT TYPE | DESCRIPTION |
|---|---|---|
| 0x06 | 0x00 | RESERVED FOR FUTURE USE |
| 0x06 | 0x01 | H.264 | MPEG-4 MVC, VIDEO 480i (525i), ASPECT RATIO 4:3 |
| 0x06 | 0x02 | H.264 | MPEG-4 MVC, VIDEO 480i (525i), ASPECT RATIO 16:9, WITH PAN VECTOR |
| 0x06 | 0x03 | H.264 | MPEG-4 MVC, VIDEO 480i (525i), ASPECT RATIO 16:9, WITHOUT PAN VECTOR |
| 0x06 | 0x04 | H.264 | MPEG-4 MVC, VIDEO 480i (525i), ASPECT RATIO > 16:9 |
| 0x06 | 0x05-0x90 | RESERVED FOR FUTURE USE |
| 0x06 | 0x91 | H.264 | MPEG-4 MVC, VIDEO 2160p, ASPECT RATIO 4:3 |
| 0x06 | 0x92 | H.264 | MPEG-4 MVC, VIDEO 2160p, ASPECT RATIO 16:9, WITH PAN VECTOR |
| 0x06 | 0x93 | H.264 | MPEG-4 MVC, VIDEO 2160p, ASPECT RATIO 16:9, WITHOUT PAN VECTOR |
| 0x06 | 0x94 | H.264 | MPEG-4 MVC, VIDEO 2160p, ASPECT RATIO > 16:9 |
| 0x06 | 0x95-0xA0 | RESERVED FOR FUTURE USE |
| 0x06 | 0xA1 | H.264 | MPEG-4 MVC, VIDEO 480p (525p), ASPECT RATIO 4:3 |
| 0x06 | 0xA2 | H.264 | MPEG-4 MVC, VIDEO 480p (525p), ASPECT RATIO 16:9, WITH PAN VECTOR |
| 0x06 | 0xA3 | H.264 | MPEG-4 MVC, VIDEO 480p (525p), ASPECT RATIO 16:9, WITHOUT PAN VECTOR |
| 0x06 | 0xA4 | H.264 | MPEG-4 MVC, VIDEO 480p (525p), ASPECT RATIO > 16:9 |
| 0x06 | 0xA5-0xB0 | RESERVED FOR FUTURE USE |
| 0x06 | 0xB1 | H.264 | MPEG-4 MVC, VIDEO 1080i (1125i), ASPECT RATIO 4:3 |
| 0x06 | 0xB2 | H.264 | MPEG-4 MVC, VIDEO 1080i (1125i), ASPECT RATIO 16:9, WITH PAN VECTOR |
| 0x06 | 0xB3 | H.264 | MPEG-4 MVC, VIDEO 1080i (1125i), ASPECT RATIO 16:9, WITHOUT PAN VECTOR |
| 0x06 | 0xB4 | H.264 | MPEG-4 MVC, VIDEO 1080i (1125i), ASPECT RATIO > 16:9 |
| 0x06 | 0xB5-0xC0 | RESERVED FOR FUTURE USE |
| 0x06 | 0xC1 | H.264 | MPEG-4 MVC, VIDEO 720p (750p), ASPECT RATIO 4:3 |
| 0x06 | 0xC2 | H.264 | MPEG-4 MVC, VIDEO 720p (750p), ASPECT RATIO 16:9, WITH PAN VECTOR |
| 0x06 | 0xC3 | H.264 | MPEG-4 MVC, VIDEO 720p (750p), ASPECT RATIO 16:9, WITHOUT PAN VECTOR |
| 0x06 | 0xC4 | H.264 | MPEG-4 MVC, VIDEO 720p (750p), ASPECT RATIO > 16:9 |
| 0x06 | 0xC5-0xD0 | RESERVED FOR FUTURE USE |
| 0x06 | 0xD1 | H.264 | MPEG-4 MVC, VIDEO 240p, ASPECT RATIO 4:3 |
| 0x06 | 0xD2 | H.264 | MPEG-4 MVC, VIDEO 240p, ASPECT RATIO 16:9, WITH PAN VECTOR |
| 0x06 | 0xD3 | H.264 | MPEG-4 MVC, VIDEO 240p, ASPECT RATIO 16:9, WITHOUT PAN VECTOR |
| 0x06 | 0xD4 | H.264 | MPEG-4 MVC, VIDEO 240p, ASPECT RATIO > 16:9 |
| 0x06 | 0xD5-0xE0 | RESERVED FOR FUTURE USE |
| 0x06 | 0xE1 | H.264 | MPEG-4 MVC, VIDEO 1080p (1125p), ASPECT RATIO 4:3 |
| 0x06 | 0xE2 | H.264 | MPEG-4 MVC, VIDEO 1080p (1125p), ASPECT RATIO 16:9, WITH PAN VECTOR |
| 0x06 | 0xE3 | H.264 | MPEG-4 MVC, VIDEO 1080p (1125p), ASPECT RATIO 16:9, WITHOUT PAN VECTOR |
| 0x06 | 0xE4 | H.264 | MPEG-4 MVC, VIDEO 1080p (1125p), ASPECT RATIO > 16:9 |
| 0x06 | 0xE5-0xFF | RESERVED FOR FUTURE USE |

FIG.5D

| COMPONENT CONTENTS | COMPONENT TYPE | DESCRIPTION |
|---|---|---|
| 0x07 | 0x00 | RESERVED FOR FUTURE USE |
| 0x07 | 0x01 | 3D VIDEO SIDE-BY-SIDE 720p, ASPECT RATIO 4:3 |
| 0x07 | 0x02 | 3D VIDEO SIDE-BY-SIDE 720p, ASPECT RATIO 16:9, WITH PAN VECTOR |
| 0x07 | 0x03 | 3D VIDEO SIDE-BY-SIDE 720p, ASPECT RATIO 16:9, WITHOUT PAN VECTOR |
| 0x07 | 0x04 | 3D VIDEO SIDE-BY-SIDE 720p, ASPECT RATIO > 16:9 |
| 0x07 | 0x05-0x90 | RESERVED FOR FUTURE USE |
| 0x07 | 0x91 | 3D VIDEO SIDE-BY-SIDE 1080i, ASPECT RATIO 4:3 |
| 0x07 | 0x92 | 3D VIDEO SIDE-BY-SIDE 1080i, ASPECT RATIO 16:9, WITH PAN VECTOR |
| 0x07 | 0x93 | 3D VIDEO SIDE-BY-SIDE 1080i, ASPECT RATIO 16:9, WITHOUT PAN VECTOR |
| 0x07 | 0x94 | 3D VIDEO SIDE-BY-SIDE 1080i, ASPECT RATIO > 16:9 |
| 0x07 | 0x95-0xA0 | RESERVED FOR FUTURE USE |
| 0x07 | 0xA1 | 3D VIDEO SIDE-BY-SIDE 1080p, ASPECT RATIO 4:3 |
| 0x07 | 0xA2 | 3D VIDEO SIDE-BY-SIDE 1080p, ASPECT RATIO 16:9, WITH PAN VECTOR |
| 0x07 | 0xA3 | 3D VIDEO SIDE-BY-SIDE 1080p, ASPECT RATIO 16:9, WITHOUT PAN VECTOR |
| 0x07 | 0xA4 | 3D VIDEO SIDE-BY-SIDE 1080p, ASPECT RATIO > 16:9 |
| 0x07 | 0xA5-0xFF | RESERVED FOR FUTURE USE |

FIG.5E

| COMPONENT CONTENTS | COMPONENT TYPE | DESCRIPTION |
|---|---|---|
| 0x08 | 0x00 | RESERVED FOR FUTURE USE |
| 0x08 | 0x01 | 3D VIDEO TOP-AND-BOTTOM 720p, ASPECT RATIO 4:3 |
| 0x08 | 0x02 | 3D VIDEO TOP-AND-BOTTOM 720p, ASPECT RATIO 16:9, WITH PAN VECTOR |
| 0x08 | 0x03 | 3D VIDEO TOP-AND-BOTTOM 720p, ASPECT RATIO 16:9, WITHOUT PAN VECTOR |
| 0x08 | 0x04 | 3D VIDEO TOP-AND-BOTTOM 720p, ASPECT RATIO > 16:9 |
| 0x08 | 0x05-0x90 | RESERVED FOR FUTURE USE |
| 0x08 | 0x91 | 3D VIDEO TOP-AND-BOTTOM 1080i, ASPECT RATIO 4:3 |
| 0x08 | 0x92 | 3D VIDEO TOP-AND-BOTTOM 1080i, ASPECT RATIO 16:9, WITH PAN VECTOR |
| 0x08 | 0x93 | 3D VIDEO TOP-AND-BOTTOM 1080i, ASPECT RATIO 16:9, WITHOUT PAN VECTOR |
| 0x08 | 0x94 | 3D VIDEO TOP-AND-BOTTOM 1080i, ASPECT RATIO > 16:9 |
| 0x08 | 0x95-0xA0 | RESERVED FOR FUTURE USE |
| 0x08 | 0xA1 | 3D VIDEO TOP-AND-BOTTOM 1080p, ASPECT RATIO 4:3 |
| 0x08 | 0xA2 | 3D VIDEO TOP-AND-BOTTOM 1080p, ASPECT RATIO 16:9, WITH PAN VECTOR |
| 0x08 | 0xA3 | 3D VIDEO TOP-AND-BOTTOM 1080p, ASPECT RATIO 16:9, WITHOUT PAN VECTOR |
| 0x08 | 0xA4 | 3D VIDEO TOP-AND-BOTTOM 1080p, ASPECT RATIO > 16:9 |
| 0x08 | 0xA5-0xFF | RESERVED FOR FUTURE USE |
| 0x09-0x08 | 0x00-0xFF | RESERVED FOR FUTURE USE |
| 0x0C-0x0F | 0x00-0xFF | DEFINED BY SERVICE PROVIDER |

FIG.6

| DATA STRUCTURE | NUMBER OF BITS | BIT STRING REPRESENTATION |
|---|---|---|
| component_group_descriptor () { | | |
|     descriptor_tag | 8 | uimsbf |
|     descriptor_length | 8 | uimsbf |
|     component_group_type | 3 | uimsbf |
|     total_bit_rate_flag | 1 | uimsbf |
|     num_of_group | 4 | uimsbf |
|     for(i=0;1<num_of_group;i++){ | | |
|         component_group_id | 4 | uimsbf |
|         num_of_CA_unit | 4 | uimsbf |
|         for(i=0;1<num_of_CA_unit;i++){ | | |
|             CA_unit_id | 4 | uimsbf |
|             num_of_component | 4 | uimsbf |
|             for(i=0;1<num_of_component;i++){ | | |
|                 component_tag | 8 | uimsbf |
|             } | | |
|         } | | |
|         if(total_bit_rate_flag==1){ | | |
|             total_bit_rate | 8 | uimsbf |
|         } | | |
|         text_length | 8 | uimsbf |
|         for(i=0;1<text_length;i++){ | | |
|             text_char | 8 | uimsbf |
|         } | | |
|     } | | |
| } | | |

FIG.7

| COMPONENT GROUP IDENTIFICATION | DESCRIPTION |
|---|---|
| 000 | MULTIVIEW TV SERVICE |
| 001 | 3D TV SERVICE |
| 002-111 | UNDEFINED |

FIG.8

| COMPONENT GROUP IDENTIFICATION | DESCRIPTION |
|---|---|
| 0x0 | MAIN GROUP |
| 0x1-0xF | SUBGROUP |

FIG.9

| ACCOUNTING UNIT IDENTIFICATION | DESCRIPTION |
|---|---|
| 0x0 | NONACCOUNTING UNIT GROUP |
| 0x1 | ACCOUNTING UNIT GROUP INCLUDING DEFAULT ES GROUP |
| 0x2-0xF | ACCOUNTING UNIT GROUP OTHER THAN ABOVE |

FIG.10

| DATA STRUCTURE | NUMBER OF BITS | BIT STRING REPRESENTATION |
|---|---|---|
| 3d_encode_descriptor () { | | |
|     descriptor_tag | 8 | uimsbf |
|     descriptor_length | 8 | uimsbf |
|     3d_method_type | 8 | uimsbf |
|     stream_type | 8 | uimsbf |
|     for(i=0;1<N;i++){ | | |
|         component_tag | 8 | uimsbf |
|     } | | |
| } | | |

FIG.11

| 3D METHOD TYPE | DESCRIPTION |
|---|---|
| 0x00 | RESERVED FOR FUTURE USE |
| 0x01 | FRAME PACKING METHOD |
| 0x02 | SIDE-BY-SIDE METHOD |
| 0x03 | TOP-AND-BOTTOM METHOD |
| 0x04-0x0F | RESERVED FOR FUTURE USE |

FIG.12

| DATA STRUCTURE | NUMBER OF BITS | BIT STRING REPRESENTATION |
|---|---|---|
| service_descriptor () { | | |
|     descriptor_tag | 8 | uimsbf |
|     descriptor_length | 8 | uimsbf |
|     service_type | 8 | uimsbf |
|     service_provider_name_length | 8 | uimsbf |
|     for(i=0;1<N;i++){ | | |
|         char | 8 | uimsbf |
|     } | | |
|     service_name_length | 8 | uimsbf |
|     for(i=0;1<N;i++){ | | |
|         char | 8 | uimsbf |
|     } | | |
| } | | |

FIG.13

| SERVICE FORM TYPE | MEANING |
|---|---|
| 0x00 | UNDEFINED |
| 0x01 | DIGITAL TV SERVICE |
| 0x02 | DIGITAL AUDIO SERVICE |
| 0x03-0x10 | UNDEFINED |
| 0x11 | 3D VIDEO SERVICE |
| 0x12-0x7F | UNDEFINED |
| 0x80-0xA0 | DEFINED BY SERVICE PROVIDER |
| 0xA1 | TEMPORARY VIDEO SERVICE |
| 0xA2 | TEMPORARY AUDIO SERVICE |
| 0xA3 | TEMPORARY DATA SERVICE |
| 0xA4 | ENGINEERING SERVICE |
| 0xA5 | PROMOTION VIDEO SERVICE |
| 0xA6 | PROMOTION AUDIO SERVICE |
| 0xA7 | PROMOTION DATA SERVICE |
| 0xA8 | PREVIOUS STORAGE DATA SERVICE |
| 0xA9 | STORAGE DEDICATED DATA SERVICE |
| 0xAA | BOOK MARK LIST DATA SERVICE |
| 0xAB | SERVER SIMULTANEOUS SERVICE |
| 0xAC | INDEPENDENT FILE SERVICE |
| 0xAD-0xBF | UNDEFINED (STANDARDIZATION AGENCY DEFINITION AREA) |
| 0xC0 | DATA SERVICE |
| 0xC1 | STORAGE SERVICE USING TLV |
| 0xC2-0xFF | UNDEFINED |

FIG.14

| DATA STRUCTURE | NUMBER OF BITS | BIT STRING REPRESENTATION |
|---|---|---|
| service_list_descriptor () { | | |
|    descriptor_tag | 8 | uimsbf |
|    descriptor_length | 8 | uimsbf |
|    for(i=0;1<N;i++){ | | |
|       service_id | 16 | uimsbf |
|       service_type | 8 | uimsbf |
|    } | | |
| } | | |

FIG.15

| SENDING OPERATION RULE FOR EACH FIELD (COMPONENT DESCRIPTOR) | |
|---|---|
| descriptor_tag | "0X50" IS DESCRIBED. |
| descriptor_length | DESCRIPTOR LENGTH OF COMPONENT DESCRIPTOR IS DESCRIBED. MAXIMUM VALUE IS NOT PRESCRIBED. |
| stream_content | "0X01" (VIDEO) IS DESCRIBED. |
| component_type | VIDEO COMPONENT TYPE OF COMPONENT IS DESCRIBED. |
| component_tag | COMPONENT TAG VALUE WHICH BECOMES UNIQUE IN PROGRAM IS DESCRIBED. |
| ISO_639_language_code | "jpn ("0X6A706E")" IS DESCRIBED. |
| text_char | VIDEO KIND NAMES ARE DESCRIBED WITH 16 BYTES (EIGHT EM CHARACTERS) OR LESS WHEN THERE ARE A PLURALITY OF VIDEO COMPONENTS. LINE FEED CODE IS NOT USED. IF COMPONENT DESCRIPTION IS DEFAULT CHARACTER STRING, THIS FIELD CAN BE OMITTED. DEFAULT CHARACTER STRING IS "VIDEO" |

FIG.16

| SENDING OPERATION RULE FOR EACH FIELD (COMPONENT GROUP DESCRIPTOR) | |
|---|---|
| descriptor_tag | "0XD9" IS DESCRIBED. |
| descriptor_length | DESCRIPTOR LENGTH OF COMPONENT GROUP DESCRIPTOR IS DESCRIBED. MAXIMUM VALUE IS NOT PRESCRIBED. |
| component_group_type | TYPE OF A COMPONENT GROUP IS INDICATED.<br>'000': MULTIVIEW TV<br>'001': 3D TV |
| total_bit_rate_flag | = '0': ALL TOTAL BIT RATES IN GROUP IN EVENT HAVE PRESCRIBED DEFAULT VALUE.<br>= '1': ANY OF TOTAL BIT RATES IN GROUP IN EVENT EXCEEDS PRESCRIBED DEFAULT VALUE. |
| num_of_group | NUMBER OF COMPONENT GROUPS IN EVENT IS DESCRIBED. IN CASE OF MVTV, NUMBER IS SET TO A MAXIMUM OF 3. IN CASE OF 3D TV, THE NUMBER IS SET TO A MAXIMUM OF 2. |
| component_group_id | COMPONENT GROUP IDENTIFICATION IS DESCRIBED. "0X0" IS ASSIGNED TO MAIN GROUP. IN CASE OF EACH SUBGROUP, BROADCASTING SERVICE PROVIDER ASSIGNS A VALUE UNIQUELY IN THE EVENT. |
| num_of_CA_unit | NUMBER OF ACCOUNTING/NONACCOUNTING UNITS IN COMPONENT GROUP IS DESCRIBED. MAXIMUM VALUE IS 2. IF COMPONENTS TO BE ACCOUNTED ARE NOT INCLUDED IN COMPONENT GROUP AT ALL, FIELD IS SET TO "0X1." |
| CA_unit_id | ACCOUNTING UNIT IDENTIFICATION IS DESCRIBED. BROADCASTING SERVICE PROVIDER CONDUCTS UNIQUE ASSIGNMENT IN EVENT. |
| num_of_component | NUMBER OF COMPONENTS WHICH BELONG TO COMPONENT GROUP AND BELONG TO ACCOUNTING/NONACCOUNTING UNIT INDICATED BY IMMEDIATELY PRECEDING CA_unit_id IS DESCRIBED. MAXIMUM VALUE IS 15. |
| component_tag | COMPONENT TAG VALUE BELONGING TO COMPONENT GROUP IS DESCRIBED. |
| total_bit_rate | TOTAL BIT RATE IN COMPONENT GROUP IS DESCRIBED. IN CASE OF DEFAULT, "0X00" IS DESCRIBED. |
| text_length | BYTE LENGTH OF SUBSEQUENT COMPONENT GROUP DESCRIPTION IS DESCRIBED. MAXIMUM VALUE IS 16 (EIGHT EM CHARACTERS). |
| text_char | DESCRIPTION CONCERNING COMPONENT GROUP IS DESCRIBED WITHOUT FAIL. DEFAULT CHARACTER STRING IS NOT PRESCRIBED. LINE FEED CODE IS NOT USED. |

FIG.17

| SENDING OPERATION RULE FOR EACH FIELD (3D PROGRAM DETAIL DESCRIPTOR) | |
|---|---|
| descriptor_tag | "0XE1" IS DESCRIBED. |
| descriptor_length | DESCRIPTOR LENGTH OF 3D PROGRAM DETAIL DESCRIPTOR IS DESCRIBED. |
| 3d_method_type | 3D METHOD TYPE IS DESCRIBED ACCORDING TO FIG.11. |
| stream_type | ES FORM OF PROGRAM IS DESCRIBED ACCORDING TO FIG.3. |
| component_tag | COMPONENT TAG VALUE WHICH BECOMES UNIQUE IN PROGRAM IS DESCRIBED. |

FIG.18

| SENDING OPERATION RULE FOR EACH FIELD (SERVICE DESCRIPTOR) | |
|---|---|
| descriptor_tag | "0X48" IS DESCRIBED. |
| descriptor_length | DESCRIPTOR LENGTH OF SERVICE DESCRIPTOR IS DESCRIBED. |
| service_type | SERVICE FORM TYPE IS SET ACCORDING TO FIG.13. |
| service_provider_name_length | SERVICE PROVIDER NAME LENGTH IS DESCRIBED IN BS/CS DIGITAL TV BROADCASTING. MAXIMUM VALUE IS 20. IN TERRESTRIAL DIGITAL TV BROADCASTING, service_provider_name IS NOT USED AND CONSEQUENTLY "0X00" IS DESCRIBED. |
| char | SERVICE PROVIDER NAME IS DESCRIBED WITH MAXIMUM OF TEN EM CHARACTERS IN BS/CS DIGITAL TV BROADCASTING. IN TERRESTRIAL DIGITAL TV BROADCASTING, NOTHING IS DESCRIBED. |
| service_name_length | SERVICE NAME LENGTH IS DESCRIBED. MAXIMUM VALUE IS 20. |
| char | SERVICE NAME IS DESCRIBED WITH 20 BYTES OR LESS AND 10 EM CHARACTERS OR LESS. |

FIG.19

| SENDING OPERATION RULE FOR EACH FIELD (SERVICE LIST DESCRIPTOR) | |
|---|---|
| descriptor_tag | "0X41" IS DESCRIBED. |
| descriptor_length | DESCRIPTOR LENGTH OF SERVICE LIST DESCRIPTOR IS DESCRIBED. |
| loop | AS MANY LOOPS AS NUMBER OF SERVICES INCLUDED IN OBJECT TRANSPORT STREAM IS DESCRIBED. |
| service_id | sevice_id INCLUDED IN TRANSPORT STREAM IS DESCRIBED. |
| service_type | SERVICE FORM TYPE OF OBJECT SERVICE IS DESCRIBED ACCORDING TO FIG.13. |

FIG.20

| RECEPTION PROCESSING CRITERION FOR EACH FIELD (COMPONENT DESCRIPTOR) | |
|---|---|
| descriptor_tag | IF IT IS "0X50," DESCRIPTOR IS JUDGED TO BE COMPONENT DESCRIPTOR. |
| descriptor_length | IT IS JUDGED TO BE DESCRIPTOR LENGTH OF COMPONENT DESCRIPTOR. |
| stream_content | = "0X01": DESCRIPTOR IS JUDGED TO BE VALID (VIDEO).<br>≠ "0X01": DESCRIPTOR IS JUDGED TO BE INVALID. |
| component_type | IT IS JUDGED TO BE VIDEO COMPONENT TYPE OF COMPONENT (AS FOR COMPONENT TYPE, SEE FIG.5). |
| component_tag | IT IS COMPONENT TAG VALUE WHICH BECOMES UNIQUE IN PROGRAM. IT CAN BE UTILIZED IN ASSOCIATION WITH COMPONENT VALUE OF STREAM IDENTIFIER IN PMT. |
| ISO_639_language_code | CHARACTER CODE DISPOSED SUBSEQUENTLY IS HANDLED AS "jpn" EVEN IF IT IS NOT "jpn ("0X6A706E")." |
| text_char | CHARACTERS WITHIN 16 BYTES (8 EM CHARACTERS) ARE JUDGED TO BE COMPONENT DESCRIPTION. IF FIELD IS OMITTED, IT IS JUDGED TO BE COMPONENT DESCRIPTION OF DEFAULT. DEFAULT CHARACTER STRING IS "VIDEO." |

FIG.21

| RECEPTION PROCESSING CRITERION FOR EACH FIELD (COMPONENT GROUP DESCRIPTOR) | |
|---|---|
| descriptor_tag | ="0XD9": DESCRIPTOR IS JUDGED TO BE COMPONENT GROUP DESCRIPTOR. |
| descriptor_length | IT IS JUDGED TO BE DESCRIPTOR LENGTH OF COMPONENT GROUP DESCRIPTOR. |
| component_group_type | '000': SERVICE IS JUDGED TO BE MULTIVIEW TV SERVICE.<br>'001': SERVICE IS JUDGED TO BE 3D TV SERVICE. |
| total_bit_rate_flag | = '0': TOTAL BIT RATE IN GROUP IN EVENT IS JUDGED TO BE NOT DESCRIBED IN DESCRIPTOR.<br>= '1': TOTAL BIT RATE IN GROUP IN EVENT IS JUDGED TO BE DESCRIBED IN DESCRIPTOR. |
| num_of_group | IT IS JUDGED TO BE NUMBER OF COMPONENT GROUPS IN EVENT. MAXIMUM VALUE EXISTS, AND IF IT IS EXCEEDED, THERE IS POSSIBILITY THAT IT WILL BE PROCESSED AS MAXIMUM VALUE. |
| component_group_id | ="0X0": GROUP IS JUDGED TO BE MAIN GROUP.<br>"0X0": GROUP IS JUDGED TO BE SUBGROUP. |
| num_of_CA_unit | IT IS JUDGED TO BE NUMBER OF ACCOUNTING/ NONACCOUNTING UNITS IN COMPONENT GROUP. IF MAXIMUM VALUE IS EXCEEDED, THERE IS POSSIBILITY THAT IT WILL BE PROCESSED AS 2. |
| CA_unit_id | "0X0": IT IS JUDGED TO BELONG TO NONACCOUNTING UNIT GROUP.<br>"0X1": IT IS JUDGED TO BE ACCOUNTING UNIT INCLUDING DEFAULT ES GROUP.<br>OTHERWISE: IT IS JUDGED TO BE OTHER THAN THE ACCOUNTING UNITS. |
| num_of_component | IT IS JUDGED TO BE NUMBER OF COMPONENTS BELONGING TO COMPONENT GROUP AND BELONGING TO ACCOUNTING/ NONACCOUNTING UNIT INDICATED BY IMMEDIATELY PRECEDING CA_unit_id. IF MAXIMUM VALUE IS EXCEEDED, THERE IS POSSIBILITY THAT IT WILL BE PROCESSED AS 15. |
| component_tag | IT IS JUDGED TO BE COMPONENT TAG VALUE BELONGING TO COMPONENT GROUP, AND IT CAN BE UTILIZED IN ASSOCIATION WITH COMPONENT TAG VALUE OF STREAM IDENTIFIER IN PMT. |
| total_bit_rate | IT IS JUDGED TO BE TOTAL BIT RATE IN COMPONENT GROUP. IF IT IS "0X00," HOWEVER, IT IS JUDGED TO BE A DEFAULT. |
| text_length | ≤ 16 (8 EM CHARACTERS): IT IS JUDGED TO BE COMPONENT GROUP DESCRIPTION LENGTH.<br>> 16 (8 EM CHARACTERS): DESCRIPTION STATEMENT CORRESPONDING TO EXCESS OF COMPONENT GROUP DESCRIPTION LENGTH OVER 16 (8 EM CHARACTERS) MAY BE NEGLECTED. |
| text_char | IT INDICATES DESCRIPTION STATEMENT CONCERNING COMPONENT GROUP. |

FIG.22

| RECEPTION PROCESSING CRITERION FOR EACH FIELD (3D PROGRAM DESCRIPTOR) | |
|---|---|
| descriptor_tag | "0XE1" IS DESCRIBED. |
| descriptor_length | DESCRIPTOR LENGTH OF 3D PROGRAM DETAIL DESCRIPTOR IS DESCRIBED. |
| 3d_method_type | IT IS JUDGED TO BE 3D METHOD TYPE IN 3D PROGRAM, WHICH IS SPECIFIED ACCORDING TO FIG.11. |
| stream_type | IT IS JUDGED TO BE ES FORM OF 3D PROGRAM SPECIFIED ACCORDING TO FIG.3. |
| component_tag | IT IS JUDGED TO BE COMPONENT TAG VALUE WHICH BECOMES UNIQUE IN 3D PROGRAM. |

FIG.23

| RECEPTION PROCESSING CRITERION FOR EACH FIELD (SERVICE DESCRIPTOR) | |
|---|---|
| descriptor_tag | ="0X48": DESCRIPTOR IS JUDGED TO BE SERVICE DESCRIPTOR. |
| descriptor_length | IT IS JUDGED TO BE DESCRIPTOR LENGTH OF SERVICE DESCRIPTOR. |
| service_type | IF IT IS OTHER THAN service_type SHOWN IN FIG. 13, DESCRIPTOR IS JUDGED TO BE INVALID. |
| service_provider_name_length | BS/CS DIGITAL TV BROADCASTING:<br>  ≤ 20: IT IS JUDGED TO BE SERVICE PROVIDER NAME LENGTH.<br>  > 20: SERVICE PROVIDER NAME IS JUDGED TO INVALID.<br>TERRESTRIAL DIGITAL TV BROADCASTING:<br>  IT IS JUDGED TO BE INVALID IF IT IS OTHER THAN "0X00." |
| char | BS/CS DIGITAL TV BROADCASTING:<br>IT IS JUDGED TO BE SERVICE PROVIDER NAME.<br>TERRESTRIAL DIGITAL TV BROADCASTING:<br>CONTENTS OF DESCRIPTION ARE NEGLECTED. |
| service_name_length | ≤ 20: IT IS JUDGED TO BE SERVICE NAME LENGTH.<br>> 20: SERVICE NAME IS JUDGED TO BE INVALID. |
| char | IT IS JUDGED TO BE SERVICE NAME. |

FIG.24

| RECEPTION PROCESSING CRITERION FOR EACH FIELD (SERVICE LIST DESCRIPTOR) | |
|---|---|
| descriptor_tag | ="0X41": DESCRIPTOR IS JUDGED TO BE SERVICE LIST DESCRIPTOR. |
| descriptor_length | IT IS JUDGED TO BE DESCRIPTOR LENGTH OF SERVICE LIST DESCRIPTOR. |
| loop | AS MANY LOOPS AS THE NUMBER OF SERVICES INCLUDED IN OBJECT TRANSPORT STREAM ARE DESCRIBED. |
| service_id | IT IS JUDGED TO BE sevice_id FOR TRANSPORT STREAM |
| service_type | IT INDICATES SERVICE TYPE OF OBJECT SERVICE. SERVICE TYPES OTHER THAN THOSE PRESCRIBED IN FIG.13 ARE JUDGED TO BE INVALID. |

DIGITAL CONTENTS RECEIVER, DIGITAL CONTENTS RECEIVING METHOD AND DIGITAL CONTENTS TRANSMITTING AND RECEIVING METHOD

INCORPORATION BY REFERENCE

The present application is a continuation of U.S. patent application Ser. No. 13/089,519 filed on Apr. 19, 2011, which claims benefit of priority to the Japanese applications, JP2010-097498 filed on Apr. 21, 2010 and JP2010-097499 filed on Apr. 21, 2010, the content of all of which are hereby incorporated by reference into this application.

BACKGROUND OF THE INVENTION

The present invention relates to a broadcast receiver, receiving method and transmitting and receiving method of a three-dimensional (hereafter abbreviated to 3D) video.

In JP-A-2003-9033, it is described that the problem to be solved is "to provide a digital broadcast receiver which actively notifies a user that a program which the user wants will start on a certain channel or the like" (see [0005] in JP-A-2003-9033). In JP-A-2003-9033, it is also described that means for solving the problem is "to include means for taking out program information included in a digital broadcasting wave and selecting a notification object program by using selection information registered by the user, and means for displaying a message notifying existence of the selected notification object program in an interrupt form on a screen which is being displayed" (see [0006] in JP-A-2003-9033).

SUMMARY OF THE INVENTION

In JP-A-2003-9033, however, there is no disclosure concerning viewing of 3D contents. Therefore, there is a problem that it cannot be recognized that a program which is now being received by a receiver or a program which will be received by the receiver in the future is a 3D program.

In order to solve the above-described problem, according to an embodiment of the present invention, for example, identification information including program contents which contain video information and information identifying whether the program contents are 2D program contents or 3D program contents is received, and video processing of video information of the program contents is changed according to the received identification information.

According to the present invention, it becomes possible to recognize that a program which is now being received by a receiver or a program which will be received by the receiver in the future is a 3D program and it becomes possible to enhance the convenience of the user.

Other objects, features and advantages of the invention will become apparent from the following description of the embodiments of the invention taken in conjunction with the accompanying drawings.

BRIEF DESCRIPTION OF THE DRAWINGS

FIG. 3 shows an example of assignment of stream form types;

FIG. 4 shows an example of a structure of a component descriptor;

FIG. 5A shows examples of component contents and a component type which are components of a component descriptor;

FIG. 5B shows examples of component contents and a component type which are components of a component descriptor;

FIG. 5C shows examples of component contents and a component type which are components of a component descriptor;

FIG. 5D shows examples of component contents and a component type which are components of a component descriptor;

FIG. 5E shows examples of component contents and a component type which are components of a component descriptor;

FIG. 6 shows an example of a structure of a component descriptor;

FIG. 7 shows examples of a component group type;

FIG. 8 shows examples of component group identification;

FIG. 9 shows examples of accounting unit identification;

FIG. 10 shows an example of a structure of a 3D program detail descriptor;

FIG. 11 is a diagram showing examples of a 3D method type;

FIG. 12 shows an example of a structure of a service descriptor;

FIG. 13 shows examples of a service form type;

FIG. 14 shows an example of a structure of a service list descriptor;

FIG. 15 shows examples of a sending operation rule of a component descriptor in a transmitter 1;

FIG. 16 shows examples of a sending operation rule of a component group descriptor in a transmitter 1;

FIG. 17 shows examples of a sending operation rule of a 3D program detail descriptor in a transmitter 1;

FIG. 18 shows examples of a sending operation rule of a service descriptor in a transmitter 1;

FIG. 19 shows examples of a sending operation rule of a service list descriptor in a transmitter 1;

FIG. 20 shows examples of processing for respective fields in a component descriptor in a receiver 4;

FIG. 21 shows examples of processing for respective fields in a component group descriptor in a receiver 4;

FIG. 22 shows examples of processing for respective fields in a 3D program detail descriptor in a receiver 4;

FIG. 23 shows examples of processing for respective fields in a service descriptor in a receiver 4;

FIG. 24 shows examples of processing for respective fields in a service list descriptor in a receiver 4;

DESCRIPTION OF THE EMBODIMENTS

Hereafter, an embodiment of the present invention will be described. However, the present invention is not restricted to the present embodiment. In the present embodiment, a receiver is mainly described. The present embodiment is suitable for implementation in receivers. However, application of the present invention to uses other than receivers is not hindered. Furthermore, it is not necessary to adopt all of the configurations of the embodiment, but choice is possible.
<System>

Figure 1:
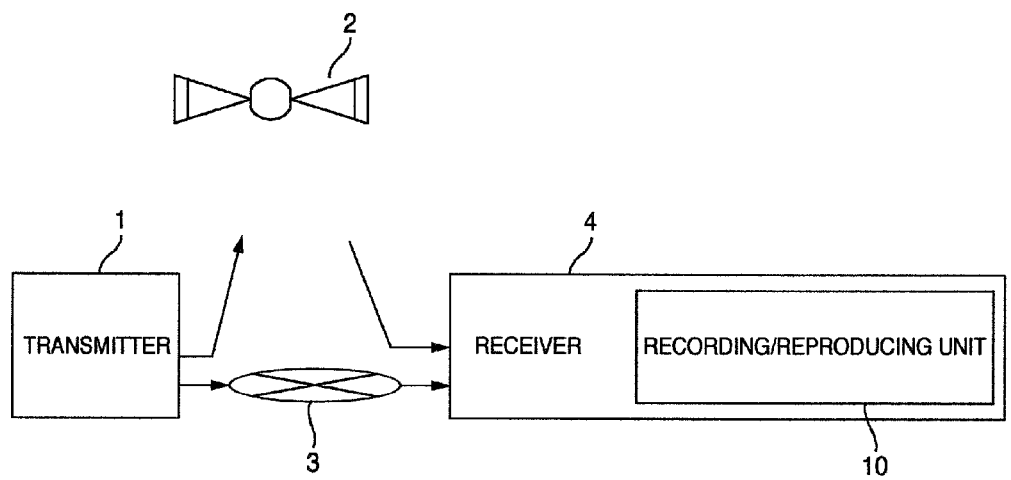
FIG. 1 is an example of a block diagram showing a configuration example of a system.

FIG. 1 is a block diagram showing a configuration example of a system according to the present system. The case where information is transmitted/received by broadcast and recorded/reproduced is exemplified. However, transmission/reception of information is not restricted to broadcast, but VOD (Video on Demand) may be used. They are generally referred to as delivery.

Reference numeral 1 denotes a transmitter installed in an information providing station such as a broadcasting station, 2 a relay apparatus installed in a relay station or a broadcasting satellite, 3 a public line network coupling an ordinary home to a broadcasting station, such as the Internet, 4 a receiver installed in a user's house, and 10 a receiving recording/reproducing device incorporated in the receiver 4. The receiving recording and reproducing unit 10 can record and reproduce broadcasted information or can reproduce contents supplied from a removable external medium.

The transmitter 1 transmits a modulated signal radio wave via the relay apparatus 2. Instead of the transmission using a satellite shown in FIG. 1, for example, transmission using a cable, transmission using a telephone line, transmission using terrestrial wave broadcasting, transmission via a network such as the Internet using the public line network 3, or the like may also be used. The signal radio wave received by the receiver 4 is demodulated and then a resultant information signal is recorded on a recording medium as occasion demands as described later. Or in the case where information is transmitted via the public line network 3, the information is converted to a form such as a data form (IP packets) based on a protocol (for example, TCP/IP) suitable for the public line network 3, and the receiver 4 which has received the data decodes the data to an information signal, yields a signal suitable for recording, and records the signal on a recording medium as occasion demands. Furthermore, if a display is incorporated in the receiver 4, the user can view and listen to a video and an audio represented by the information signal by means of the display. Unless a display is incorporated in the receiver 4, the user can connect the receiver to a display which is not illustrated and view and listen to a video and an audio represented by the information signal by means of the display.
<Transmitter>

Figure 2:
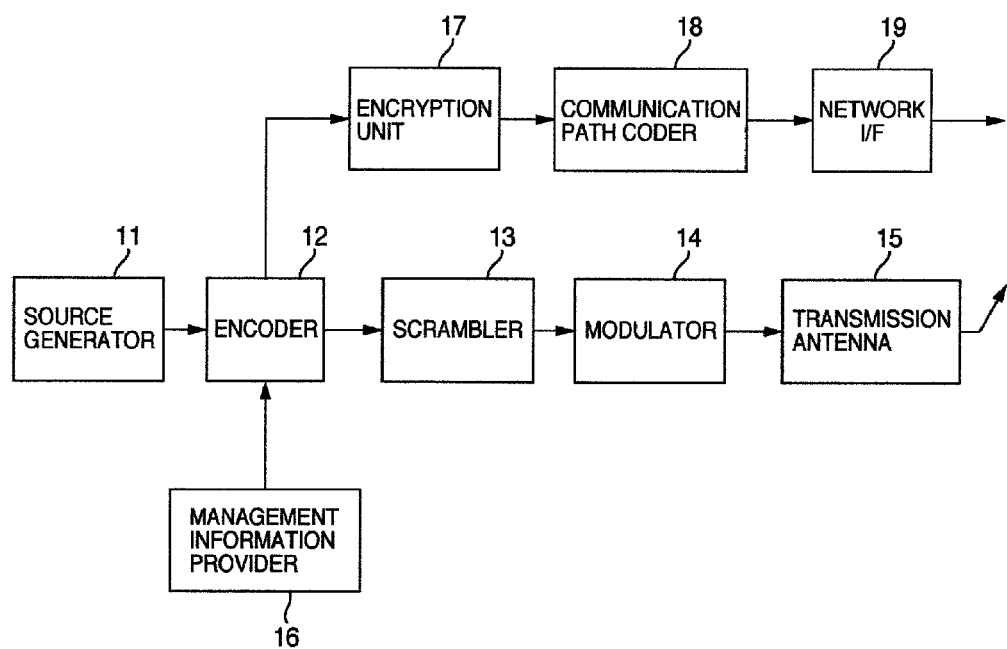
FIG. 2 is an example of a block diagram showing a configuration example of a transmitter 1.

FIG. 2 is a block diagram showing a configuration example of the transmitter 1 included in the system shown in FIG. 1.

Reference numeral 11 denotes a source generator, 12 an encoder for conducting compression in accordance with MPEG2 or H.264 method and adding program information or the like, 13 a scrambler, 14 a modulator, 15 a transmission antenna, and 16 a management information provider. Video and audio information generated by the source generator 11 formed of a camera, a recorder/reproducer, or the like is subject to data quantity compression in the encoder 12 in order to make it possible to transmit the information in a narrower occupied bandwidth. The information is subject to transmission encryption in the scrambler 13 as occasion demands in order to make it possible for specific viewers to view the information. The information is subject to modulation such as the OFDM, TC8PSK, QPSK, or multi-value QAM in the modulator 14 in order to become a signal suitable for transmission. Then the information is transmitted from the transmission antenna 15 toward the relay apparatus 2 as a radio wave. At this time, the information is provided in the management information provider 16 with program specific information such as attributes of the contents generated by the source generator 11 (such as, for example, video and audio coded information, audio coded information, a program configuration, and whether the information is a 3D video). The information is provided with program arrangement information generated by a broadcasting station (such as, for example, a configuration of a current program or the next program, a service form, or configuration information of programs corresponding to one week) or the like as well. Hereafter, the program specific information and the program arrangement information are collectively referred to as program information.

By the way, a plurality of kinds of information are often multiplexed on one radio wave by using a method such as time division or spread spectrum. In this case, there are a plurality of systems each including the source generator 11 and the encoder 12, and a multiplexer for multiplexing the plurality of kinds of information is disposed between the encoders 12 and the scrambler 13.

As for the signal to be transmitted via the public line network 3 as well, the signal generated by the coder 12 is encrypted in an encryption unit 17 as occasion demands in order to make it possible for specific viewers to view the information in the same way. The signal is coded in a communication path coder 18 in order to become a signal suitable for transmission. Then the signal is transmitted from a network I/F (interface) 19 toward the public line network 3.
<3D Transmission Method>

The transmission method of a 3D program transmitted from the transmitter 1 is broadly divided into two methods. In one of the methods, the existing broadcasting method of a 2D program is used and videos for the left eye and the right eye are contained in one image. In this method, the existing MPEG2 (Moving Picture Experts Group 2) or H.264 AVC (Advanced Video Coding) is utilized as the video compression method. As for its features, there is interchangeability with existing broadcasting, the existing relay infrastructures can be utilized, and reception in the existing receiver (such as the STB (Set Top Box)) is possible. However, the 3D video is transmitted with half of the highest resolution of the existing broadcasting (in the vertical direction or the horizontal direction). For example, there are the "side-by-side" method in which the video is divided into left and right parts and housed, the "top-and-bottom" method in which the video is divided into upper and lower parts and housed, the "field alternative" method in which the video is housed by utilizing the interlace, the "line alternative" method in which videos for the left eye and the right eye are housed respectively in alternate scanning lines, and the "left+depth" method in which a two-dimensional (one side) video and depth (distance to the subject) information of each pixel are housed. In these methods, one image is divided into a plurality of images and images of a plurality of viewpoints are housed. As for the coding method itself, therefore, the MPEG2 or H.264 AVC (except MVC (Multi View Coding)) coding method which is not originally the multiple viewpoint video coding method can be used intact. This results in a merit that 3D program broadcasting can be conducted by utilizing the existing 2D program broadcasting method.

As the other of the above-described two methods, there is the "frame packing" method in which videos for the left eye and the right eyes are transmitted. The "frame packing" method has no interchangeability with the existing 2D program broadcasting method. In this method, for example, H.264 MVC which is the multi view coding method is used as the video compression method. Its feature is that a 3D video of high resolution can be transmitted. Use of this method brings about an effect that a 3D video of high resolution can be transmitted. The multi view coding method is a coding method standardized to code a multi view video. In the multi view coding method, a multi view video can be coded without dividing one image every viewpoint, and a different image is coded every viewpoint.

Even if an coding method such as the MPEG2 or H.264 AVC (except MVC) coding method which is not originally an coding method prescribed as the multi view coding method is not used, display in the "frame packing" is also possible by generating a stream which houses a video for the left eye and a frame for the right eye alternately.

<Program Information>

The program specific information and the program arrangement information are referred to as program information.

The program specific information is referred to as PSI as well. The program specific information is information required to select a desired program. The program specific information includes four tables: a PAT (Program Association Table) which specifies a packet identifier of a TS packet for transmitting a PMT (Program Map Table) relating to a broadcasting program; a PMT (Program Map Table) which specifies a packet identifier of a TS packet for transmitting coded signals forming the broadcasting program and a packet identifier of a TS packet for transmitting common information included in relating information of charged broadcasting; an NIT (Network Information Table) for transmitting information which relates information of s transmission line such as a modulation frequency to a broadcasting program; and a CAT (Conditional Access Table) specifying a packet identifier of a TS packet which transmits individual information included in relating information of charged broadcasting. The program specific information is prescribed by the MPEG2 system standards. For example, the program specific information includes video coded information, audio coded information, and a program configuration. In the present invention, in addition, information indicating whether the video is 3D video is newly included in the program specific information. The PSI is added by the management information provider 16.

The program arrangement information is called SI (Service Information) as well. The program arrangement information is various kinds of information prescribed for convenience of program selection. The PSI information in the MPEG2 system standards is also included in the program arrangement information. The various kinds of information include an EIT (Event Information Table) which describes information concerning a program such as a program name, broadcasting date, and program contents, and an SDT (Service Description Table) which describes information concerning a service such as a service name and a broadcasting service provider name.

The program arrangement information includes, for example, information which indicates configurations of a program which is now being broadcasted and a next program which will be broadcasted, a service form, and configuration information of programs corresponding to one week. The information is added by the management information provider 16.

The program information includes a component descriptor, a component group descriptor, a 3D program detail descriptor, a service descriptor, and a service list descriptor. These descriptors are described in tables such as the PMT, EIT [schedule basic/schedule extended/present/following], NIT, and SDT.

As for proper use of the tables PMT and EIT, for example, only information of a program which is now being broadcasted is described in the PMT and consequently information of programs which will be broadcasted in the future cannot be confirmed. However, there are features that the time taken until reception is completed is short because the period of transmission from the transmission side is short, and reliability is high in the sense that there are no changes because the PMT represents information of the program which is now being broadcasted. On the other hand, as for EIT [schedule basic/schedule extended], information corresponding to seven days to come can be acquired besides the program which is now being broadcasted. However, there are demerits that the time taken until reception is completed is long because the period of transmission from the transmission side is longer as compared with the PMT, a large storage area needs to be retained, and reliability is low in the sense that there is a possibility of being changed because the EIT represents events in the future. As for EIT [following], information of a program in the next broadcasting time can be acquired.

The PMT in the program specific information can indicate a form of an ES (Elementary Stream) of a program which is now being broadcasted by using a table structure prescribed by ISO/IEC 13818-1 and a stream_type (stream form type) which is 8-bit information described in a 2nd loop (a loop of every ES) of the structure as shown in FIG. 3. "MVC video stream prescribed by ITU-T recommendations H.264 ISO/IEC 14496 vide" (the so-called "H. 264 MVC" stream indicating a multiple viewpoint coded video stream which can be used in a 3D video program is assigned to 0x1F. Although it has been described that the "MVC video stream" is assigned to 0x1F, it may be assigned to one of 0x20 to 0x7E. Furthermore, the MVC video stream is a mere example, and a video stream other than the MVC may be used as long as a multiple viewpoint coded video stream which can be used in a 3D video program is indicated.

As described heretofore, the receiver 4 monitors the stream_type and the receiver 4 can recognize that the program is a program corresponding to a multiple viewpoint coded video if the stream_type is 0x1F (multiple viewpoint coded video stream). In the case of a broadcast operation method in which a multiple viewpoint coded video stream is used only in a 3D video program, the receiver 4 can recognize that a program which is being received is a 3D program, on the basis of the stream_type, resulting in an effect.

FIG. 4 shows an example of a structure of a component descriptor which is one of program information. The component descriptor indicates a type of a component (an element which constitutes a program such as, for example, a video, an audio, a character, and various data), and the component descriptor is utilized to represent an elemental stream in a character form as well. This descriptor is disposed in the PMT and/or EIT.

Meaning of the component descriptor will now be described. A field "descriptor_tag" is an 8-bit field, and a value which makes it possible to recognize the descriptor as the component descriptor is described in the field. A field "descriptor_length" is an 8-bit field, and a size of the descriptor is described in the field. A field "stream_component" (component contents) is a 4-bit field, and it represents a stream type (video, audio, and data) and it is coded in accordance with FIG. 4. A field "component_tag" (component tag) is an 8-bit field. A component stream of the service can refer to description contents (FIG. 5) indicated by the component descriptor by means of the 8-bit field.

In a program map section, values of component tags given to streams should be different values. The component tag is a label for identifying the component stream, and the component tag has the same value as the component tag in a stream identification descriptor (however, in the case where there is the stream identification descriptor in the PMT). A 24-bit field in ISO_639_language_code (language code) identifies a language of a component (an audio or data) and a language of a character description included in the descriptor.

The language code is represented by a three-alphabetic-letter code prescribed in ISO 639-2 (22). Each letter is coded by 8 bits in accordance with ISO 8859-1 (24), and the letters are inserted into a 24-bit field in that order. For example, Japanese is "jpn" in the three-alphabetic-letter code, and coded as follows: "0110 1010 0111 0000 0110 1110." A field "text_char" (component description) is an 8-bit field. A series of component description fields prescribe character description of the component stream.

FIGS. 5A to 5E show examples of the "stream_content" (component contents) and "component_type" (component type), which are components of the component descriptor. Component contents "0x01" shown in FIG. 5A represent various video formats of a video stream compressed in the MPEG2 form.

Component contents "0x05" shown in FIG. 5B represent various video formats of a video stream compressed in the AVC form. Component contents "0x06" shown in FIG. 5C represent various video formats of a 3D video stream compressed in the H.264 MVC form.

Component contents "0x07" shown in FIG. 5D represent various video formats of a stream in a side-by-side form of a 3D video compressed in the MPEG2 or H.264 AVC form.

Component contents "0x08" shown in FIG. 5E represent various video formats of a stream in a top-and-bottom form of a 3D video compressed in the MPEG2 or H.264 AVC form.

As shown in FIG. 5D or FIG. 5E, a combination representing whether the video is a 3D video, a method of the 3D video, a resolution, and an aspect ratio is indicated by a combination of the "stream_content" (component contents) and "component_type" (component type), which are components of the component descriptor. Owing to such a configuration, it becomes possible to transmit information of various video methods including the 2D program/3D program identification with a small amount of transmission quantity even for mixed broadcasting of 3D and 2D.

Especially in the case where a 3D video program is transmitted with images of a plurality of viewpoints included in one image based on the side-by-side form or top-and-bottom form by using a coding method such as the MPEG2 or H.264 AVC (except MVC) which is not originally a coding method prescribed as the multiple viewpoint coding method, it is difficult to discriminate whether images of a plurality of viewpoints are included in one image for a 3D video program and transmitted or the image is an ordinary image of one viewpoint on the basis of only the above-described "stream_type" (stream form type). In this case, therefore, discrimination of various video methods including whether the program is a 2D program/3D program should be conducted on the basis of a combination of "stream_content" (component contents) and "component_type" (component type).

As described heretofore, the receiver 4 monitors "stream_content" and "component_type." This brings about an effect that a program which is now being received or which will be received in the future can be discriminated to be a 3D program.

FIG. 6 shows an example of a structure of the component group descriptor which is one of the program information. The component group descriptor defines and discriminates a combination of components in an event. In other words, the component group descriptor describes grouping information of a plurality of components. The component group descriptor is disposed in the EIT.

Meaning of the component group descriptor will now be described. First, "descriptor_tag" is an 8-bit field, and a value which makes it possible to recognize the descriptor as the component group descriptor is described in the field. A field "descriptor_length" is an 8-bit field, and a size of the descriptor is described in the field. A field "component_group_type" (component group type) is an 8-bit field, and a component group type is represented in accordance with FIG. 7.

The component group type "001" represents a 3D TV (television) service, and it is distinguished from a multiview TV service represented by "000." The multiview TV service is a TV service capable of changing over 2D videos of a plurality of viewpoints every viewpoint and displaying a resultant 2D video. For example, in the multiple viewpoint coded video stream or a stream of a coding method which is not originally a coding method prescribed as the multi view coding method, images of a plurality of viewpoints are included in one screen and transmitted in some cases. The stream is used not only in a 3D video program but also in a multiview TV program in some cases. In this case, it might be impossible to discriminate whether the program is a 3D video program or a multiview TV program only on the basis of the stream_type (stream form type). In such a case, discrimination using the "component_group_type" (component group type) is effective. A flag "total_bit_rate_flag" (total bit rate flag) is a 1-bit flag, which represents a description state of a total bit rate in a component group in an event. If this bit is "0," it is indicated that a total bit rate field in the component group does not exist in the descriptor. If this bit is "1," it is indicated that a total bit rate field in the component group exists in the descriptor. A field "num_of_group" (the number of groups) is a 4-bit field, and it indicates the number of component groups in the event.

A field "component_group_id" (component group identification) is a 4-bit field, which describes component group identification in accordance with FIG. 8. A field "num_of__CA_unit" (the number of accounting units) is a 4-bit field, which indicates the number of accounting/nonaccounting units in the component group. A field "CA_unit_id" (accounting unit identification) is a 4-bit field, and an accounting unit identification to which the component belongs is described in the field in accordance with FIG. 9.

A field "num_of_component" (the number of components) is a 4-bit field, and the number of components which belong to the component group and belong to an accounting/nonaccounting unit indicated by immediately preceding "CA_unit_id" is indicated in the field. A field "component_tag" is an 8-bit field, which indicates a component tag value belonging to the component group.

A field "total_bit_rate" (total bit rate) is an 8-bit field, and the total bit rate of components in the component group is described in the field by raising the transmission rate of transport stream packets to a unit every ¼ Mbps. A field "text_length" (component group description length) is an 8-bit field, which represents a byte length of subsequent component group description. A field "text_char" (component group description) is an 8-bit field. A series of character information fields describe description concerning the component group.

As heretofore described, the receiver 4 monitors the "component_group_type." This brings about an effect that the program which is being received or which will be received in the future can be discriminated to be a 3D program.

An example using a new descriptor which indicates information concerning a 3D program will now be described. FIG. 10 shows an example of a structure of the 3D program detail descriptor which is one of the program information. The 3D program detail descriptor indicates detail information in the case where the program is a 3D program, and the 3D program detail descriptor is utilized for judging the 3D program in the receiver. This descriptor is disposed in the PMT and/or the EIT. The 3D program detail descriptor may coexist with the "stream_content" (component contents) and "component_type" (component type) for 3D video program shown in FIG. 5C to 5E and already described. However, a configuration in which the "stream_content" (component contents) and "component_type" (component type) for 3D video program are not transmitted by transmitting the 3D program detail descriptor may be adopted. Meaning of the 3D program detail descriptor will now be described. First, if a configuration in which the 3D program detail descriptor is transmitted in the case of a 3D video program and the 3D program detail descriptor is not transmitted in the case of a 2D video program is adopted, it becomes possible to discriminate whether the program is a 2D video program or a 3D video program on the basis of only whether there is the 3D program detail descriptor. A field "descriptor_tag" is an 8-bit field, and a value (for example, 0xE1) which makes it possible to recognize the descriptor as the 3D program detail descriptor is described in the field. A field "descriptor_length" is an 8-bit field, and a size of the descriptor is described in the field.

A field "3d_method_type" (3D method type) is an 8-bit field, which represents a 3D method type in accordance with FIG. 11. 0x01 represents the frame packing method, 0x02 represents the side-by-side method, and 0x03 represents the top-and-bottom method. A field "stream_type" (stream form type) is an 8-bit field, which indicates the ES form of the program in accordance with FIG. 3 described above.

A field "component_tag" (component tag) is an 8-bit field. The component stream of service can refer to description contents (FIGS. 5A to 5E) indicated by the component descriptor, by means of this 8-bit field. In the program map section, values of the component tag given to streams should be different values. The component tag is a label for identifying the component stream, and the component tag has the same value as the component tag in the stream identification descriptor (however, in the case where there is the stream identification descriptor in the PMT).

As heretofore described, the receiver 4 monitors the 3D program detail descriptor. This brings about an effect that the program which is being received or which will be received in the future can be discriminated to be a 3D program if the descriptor exists. In addition, if the program is a 3D program, it becomes possible to discriminate the type of the 3D transmission method.

An example of discriminating whether the video is a 3D video or a 2D video by taking service as the unit will now be described. FIG. 12 shows an example of a structure of the service descriptor which is one of the program information. The service descriptor represents a service name and its service provider name together with a service form type by using character codes. This descriptor is disposed in the SDT.

Meaning of the service descriptor will now be described. A field "service_type" (service form type) is an 8-bit field, which represents a kind of service in accordance with FIG. 13. "0x11" represents 3D video service. An 8-bit field "service_provider_name_length" (service provider name length) represents a byte length of a subsequent service provider name. A field "char" (character code) is an 8-bit field. A series of character information fields represent a service provider name or a service name. An 8-bit field of "service_name_length" (service name length) represents a byte length of a subsequent service name.

As described heretofore, the receiver 4 monitors the "service_type." This brings about an effect that the service is discriminated to be a channel of a 3D program. If it can be discriminated in this way whether the service is a 3D video service or a 2D video service, display that the service is 3D video program broadcast service becomes possible in, for example, EPG display or the like. Even in a service which mainly broadcasts 3D video programs, however, a 2D video must be broadcasted in some cases such as in the case where the source of a commercial video is only a 2D video. Therefore, it is desirable to use discrimination of a 3D video service using the "service_type" (service form type) in the service descriptor jointly with discrimination of a 3D video program using the combination of the "stream_content" (component contents) and the "component_type" (component type), discrimination of a 3D video program using the "component_group_type" (component group type), or discrimination of a 3D video program using the 3D program detail descriptor, which are already described. In the case where discrimination is conducted by combining a plurality of kinds of information, discrimination that the service is a 3D video broadcasting service, but only a partial program is a 2D video also becomes possible. If such discrimination can be conducted, then it can be expressed clearly in the receiver by using, for example, the EPG that the service is a "3D video broadcasting service" and it becomes possible to change over the display control according to whether the program is a 3D video program or a 2D video program, for example, when receiving the program as occasion demands, even if a 2D video program is mixedly present in the service besides a 3D video program.

FIG. 14 shows an example of a structure of a service list descriptor which is one of the program information. The service list descriptor provides a list of services using service identification and a service form type. In other words, a list of subchannesl and their types is described. This descriptor is disposed in the NIT.

Meaning of the service list descriptor will now be described. A field "service_id" (service identification) is a 16-bit field, which uniquely identifies information service in the transport stream. The service identification is equal to a broadcasting program number identification (program_number) in the corresponding program map section. A field "service_type" (service form type) is an 8-bit field, which represents a service kind in accordance with FIG. 13 described above.

It is possible to discriminate whether the service is "3D video broadcasting service" on the basis of the "service_type" (service form type). For example, therefore, it becomes possible to conduct display of grouping only "3D video broadcasting service" in the EPG display by using a list of channels/subchannels and their types indicated in the service list descriptor.

As described heretofore, the receiver 4 monitors the "service_type." This brings about an effect that the service can be discriminated to be a channel of a 3D program.

In the examples of descriptors described heretofore, only representative members are described. It is also conceivable to have other members, put together a plurality of members into one, and divide one member into a plurality of members having detail information.

<Sending Operation Rule Examples of Program Information>

Each of the component descriptor, the component group descriptor, the 3D program detail descriptor, the service descriptor, and the service list descriptor is, for example, information which is generated and added by the management information provider 16, stored in the PSI (such as, for example, the PMT) or the SI (such as, for example, the EIT, SDT or NIT), and sent from the transmitter 1.

Hereafter, sending operation rule examples of the program information in the transmitter 1 will be described.

FIG. 15 shows an example of a sending operation rule of the component descriptor in the transmitter 1. In the "descriptor_tag," "0x50" which means the component descriptor is described. In the "descriptor_length," the descriptor length of the component descriptor is described. A maximum value of the descriptor length is not prescribed. In the "stream_content," "0x01" (video) is described.

In the "component_type," a video component type of the component is described. As for the component type, one of them shown in FIG. 5 is set. In the "component_tag," a component tag value which becomes unique in the program is described. In the "ISO_639_language_code," "jpn ("0x6A706E")" is described.

In the "text_char," video kind names are described with 16 bytes (eight em characters) or less when there are a plurality of video components. A line feed code is not used. If the component description is a default character string, this field can be omitted. The default character string is "video."

By the way, one component descriptor is sent without fail for every video component having a component_tag value in the range of 0x00 to 0x0F included in the event (program).

In this way, the transmitter 1 conducts the sending operation and consequently the receiver 4 monitors the "stream_content" and the "component_type." This brings about an effect that the program which is now being received or which will be received in the future can be discriminated to be a 3D program.

FIG. 16 shows an example of a sending operation rule of a component group descriptor in the transmitter 1.

In the "descriptor_tag," "0xD9" which means the component group descriptor is described. In the "descriptor_length," a descriptor length of the component group descriptor is described. A maximum value of the descriptor length is not prescribed. The field "component_group_type" indicates a type of a component group, and '000' indicates the multiview TV, whereas '001' indicates the 3D TV.

In the "total_bit_rate_flag," '0' is indicated if all total bit rates in the group in the event have a prescribed default value, whereas '1' is indicated if any of the total bit rates in the group in the event has exceeded the prescribed default value.

The field "num_of_group" describes the number of component groups in the event. In the case of the multiview TV (MVTV), the number is set to a maximum of 3. In the case of the 3D TV, the number is set to a maximum of 2.

The field "component_group_id" describes component group identification. In the case of a main group, "0x0" is assigned. In the case of each subgroup, the broadcasting service provider assigns a value uniquely in the event.

The field "num_of_CA_unit" describes the number of accounting/nonaccounting units in the component group. Its maximum value is set equal to 2. If components to be accounted are not included in the component group at all, the field is set to "0x1."

The field "CA_unit_id" describes the accounting unit identification. The broadcasting service provider conducts unique assignment in the event. The field "num_of_component" describes the number of components which belong to the component group and which belong to the accounting/nonaccounting unit indicated by the immediately preceding "CA_unit_id." Its maximum value is set equal to 15.

The field "component_tag" describes a component tag value belonging to the component group. The field "total_bit_rate" describes the total bit rate in the component group. In the case of the default value, however, "0x00" is described.

The field "text_length" describes a byte length of subsequent component group description. Its maximum value is set to 16 (eight em characters). The field "text_char" describes description concerning the component group without fail. A default character string is not prescribed. A line feed code is not used.

When conducting the multiview TV service, the "component_group_type" is set to '000' and sent without fail. When conducting the 3D TV service, the "component_group_type" is set to '001' and sent without fail.

In this way, the transmitter 1 conducts the sending operation and consequently the receiver 4 monitors the "component_group_type." This brings about an effect that the program which is now being received or which will be received in the future can be discriminated to be a 3D program.

FIG. 17 shows an example of a sending operation rule of the 3D program detail descriptor in the transmitter 1. In the "descriptor_tag," "0xE1" which means the 3D program detail descriptor is described. In the "descriptor_length," a descriptor length of the 3D program detail descriptor is described. In the "3d_method_type," the 3D method type is described in accordance with FIG. 11. The field "stream_type" describes the ES form of the program in accordance with FIG. 3. The field "component_tag" describes a component tag value which becomes unique in the program.

In this way, the transmitter 1 conducts the sending operation and consequently the receiver 4 monitors the 3D program detail descriptor. This brings about an effect that the program which is now being received or which will be received in the future can be discriminated to be a 3D program if the descriptor exists.

FIG. 18 shows an example of a sending operation rule of the service descriptor in the transmitter 1. In the "descriptor_tag," "0x48" which means the service descriptor is described. In the "descriptor_length," a descriptor_length of the service descriptor is described. The field "service_type" describes a service form type.

The service form type is set in accordance with FIG. 13. In the "service_provider_name_length," a service provider name length is described in the case of the BS/CS digital TV broadcasting. Its maximum value is set equal to 20. In the case of the terrestrial digital TV broadcasting, the "service_provider_name" is not used and consequently "0x00" is described.

In the "char," a service provider name is described with a maximum of ten em characters in the case of BS/CS digital TV broadcasting. Nothing is described in the case of the terrestrial digital TV broadcasting. In the "service_name_length," a service name length is described. Its maximum value is set equal to 20. In the "char," a service name is described with 20 bytes or less and 10 em characters or less. By the way, only one service name is disposed for an object service without fail.

In this way, the transmitter 1 conducts the sending operation and consequently the receiver 4 monitors the "service_type." This brings about an effect that the service can be discriminated to be a channel of a 3D program.

FIG. 19 shows an example of a sending operation rule of the service list descriptor in the transmitter 1. In the "descriptor_tag," "0x41" which means the service list descriptor is described. In the "descriptor_length," a descriptor length of the service list descriptor is described. A field "loop" describes as many loops as the number of services included in the object transport stream.

In the "sevice_id," "sevice_id" included in the transport stream is described. In the "sevice_type," a service type of an object service is described in accordance with FIG. 13. By the way, the service type is disposed for a TS loop in the NIT without fail.

In this way, the transmitter 1 conducts the sending operation and consequently the receiver 4 monitors the "service_type." This brings about an effect that the service can be discriminated to be a channel of a 3D program.

<Hardware Configuration of Receiver>

Figure 25:
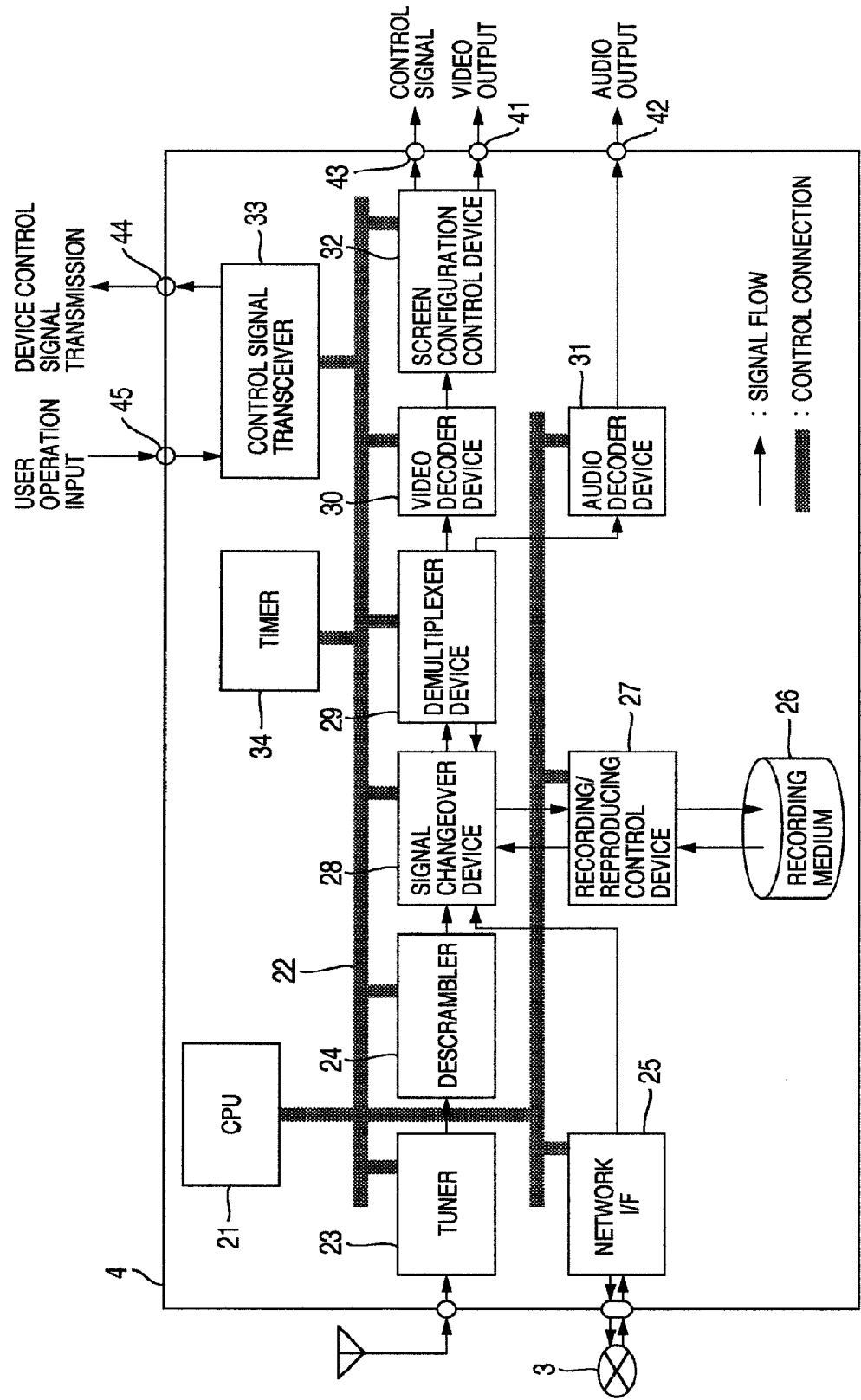
FIG. 25 is an example of a configuration diagram of a receiver according to the present invention.

FIG. 25 is a hardware configuration diagram showing a configuration example of the receiver 4 included in the system shown in FIG. 1. Reference numeral 21 denotes a CPU (Central Processing Unit) for controlling the whole receiver, 22 a universal bus for transmitting control and information between the CPU 21 and respective parts in the receiver, 23 a tuner for receiving a broadcasting signal transmitted from the transmitter 1 via a broadcasting transmission network such as radio (satellite or terrestrial) or a cable, selecting a specific frequency, conducting demodulation, error correction processing or the like, and outputting multiplexed packets such as MPEG2-Transport Stream (hereafter referred to as "TS" as well), 24 a descrambler for decoding scrambling conducted by the scrambler 13, 25 a network I/F (Interface) for transmitting and receiving various kinds of information and the MPEG2-TS between the Internet and the receiver, 26 a recording medium such as, for example, an HDD (Hard Disk Drive) or flash memory incorporated in the receiver 4 or a removable HDD, disk-type recording medium, or flash memory, 27 a recording/reproducing control device for controlling the recording medium 26 and controlling recording of a signal onto the recording medium 26 and reproduction of a signal from the recording medium 26, 28 a signal changeover device for changing over input signals from the descrambler 24, the network I/F 25 and the recording/reproducing control device 27 and outputting a signal to a demultiplexer device 29 or the recording/reproducing control device 27, and 29 a demultiplexer device for demultiplexing signals multiplexed in a form such as the MPEG2-TS into signals such as a video ES (Elementary Stream), an audio ES, and program information. The ES refers to each of the image data and audio data subjected to compression and coding. Reference numeral 30 denotes a video decoder device for decoding a video ES to a video signal, 31 an audio decoder device for decoding an audio ES to an audio signal and outputting the audio signal from an audio output 42, 32 a screen configuration control device for controlling a screen configuration, superposing a display such as, for example, an OSD (On Screen Display) generated by the CPU 21 on the video signal received from the video decoder device 30, and outputting the video signal, a synchronizing signal and a control signal (to be used for device control) from a video signal output part 41 and a control signal output part 43, 33 a control signal transceiver for receiving an operation input from a user operation input part 45 (for example, a key code from a remote controller which originates an IR (Infrared Radiation) signal) and transmitting a device control signal (for example, IR) generated by the CPU 21 and the screen configuration control device 32 and directed to an external device from a device control signal transmission part 44, and 34 a timer which has a timer therein and retains the current time. The receiver 4 is mainly formed of these devices. By the way, it is also possible to install a 3D video display instead of or in addition to the video signal output part 41 and display a video decoded by the video decoder device 30 on the 3D video display. Furthermore, it is also possible to install a speaker instead of or in addition to the audio output 42 and output a sound from the speaker on the basis of an audio signal decoded by the audio decoder. In this case, the receiver 4 becomes a 3D video display apparatus. Also in the case where display is conducted on the 3D video display, the synchronizing signal and the control signal are output from the control signal output part 43 and the device control signal transmission part 44, if necessary.

A part of the components 21 to 34 shown in FIG. 25 may be constituted by using one LSI or plurality of LSIs. Furthermore, a configuration in which partial functions of the components 21 to 34 shown in FIG. 25 are implemented by software may be used.

<Functional Block Diagram of Receiver>

Figure 26:
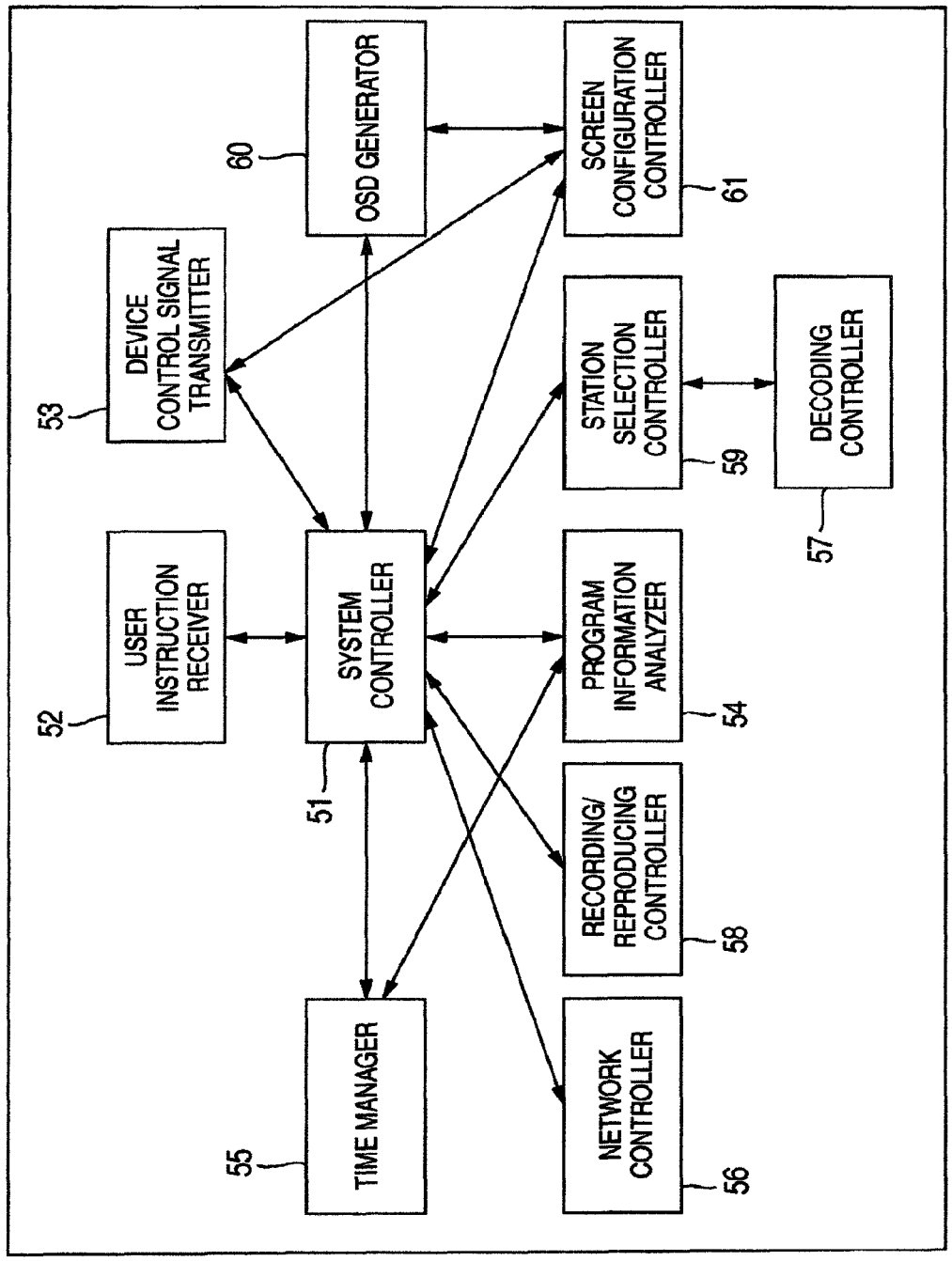
FIG. 26 is an example of a schematic diagram of a CPU internal function block diagram in a receiver according to the present invention.

FIG. 26 shows an example of a functional block configuration of processing within the CPU 21. Each function block exists as a module of software executed by, for example, the CPU 21, and delivery of information and data and control instructions are conducted between modules by using some means (for example, message passing, function calling or event transmission).

Furthermore, each module conducts information transmission/reception with each hardware in the receiver 4 as well via the universal bus 22. Relation lines (arrows) in FIG. 26 mainly show parts relating to the ensuing description. However, processing which requires communication means and communication exists between other modules as well. For example, a station selection controller 59 acquires program information required for station selection from a program information analyzer 54 suitably.

Functions of respective function blocks will now be described. A system controller 51 manages states of respective modules and user's instruction states, and gives control instructions to respective modules. A user instruction receiver 52 receives and interprets an input signal of user's operation received by the control signal transceiver 33, and conveys the user's instruction to the system controller 51. In accordance with an instruction given by the system controller 51 or another module, a device control signal transmitter 53 instructs the control signal transceiver 33 to transmit a device control signal.

The program information analyzer 54 acquires program information from the demultiplexer device 29, analyses its contents, and provides respective modules with necessary information. A time manager 55 acquires time correction information (TOT: time offset table) included in the TS, manages the current time, and gives a notice of an alarm (a notice of arrival at a specified time) or a one-shot timer (a notice of elapse of a definite time) in response to a request of each module by using a counter included in the timer 34.

A network controller 56 controls the network I/F 25, and acquires various kinds of information and the TS from a specific URL (Unique Resource Locater) or a specific IP (Internet Protocol) address. A decoding controller 57 controls the video decoder device 30 and the audio decoder device 31, and conducts decoding start, decoding stop, and acquisition of information included in a stream.

A recording/reproducing controller 58 controls the recording/reproducing control device 27, and reads out a signal from a specific position of specific contents on the recording medium 26 in an arbitrary reading form (ordinary reproduction, fast feeding, rewinding and temporary stop). Furthermore, the recording/reproducing controller 58 exercises control to record a signal which is input to the recording/reproducing control device 27 onto the recording medium 26.

The station selection controller 59 controls the tuner 23, the descrambler 24, the signal changeover device 28, the demultiplexer device 29 and the decoding controller 57, and conducts broadcast reception and broadcasting signal recording. Furthermore, the station selection controller 59 exercises control since reproduction from the recording medium is conducted until the video signal and the audio signal are output. Detailed broadcast reception operation, broadcasting signal recording operation, and operation of reproduction from the recording medium will be described later.

An OSD generator 60 generates OSD data including a specific message, and instructs a screen configuration controller 61 to superpose the generated OSD data on a video signal and output a resultant signal. The OSD generator 60 generates OSD data having parallax for left eye and right eye, and conducts 3D message display by requesting the screen configuration controller 61 to conduct 3D display on the basis of OSD data for left eye and right eye.

The screen configuration controller 61 controls the screen configuration control device 32, superposes the OSD which is input from the OSD generator 60 on the video which is input from the video decoder device 30 to the screen configuration control device 32, further conducts processing (such as scaling, PinP, and 3D display) on the video as occasion demands, and outputs a resultant video to the external. Respective function blocks provide these functions.

<Broadcast Reception>

A control procedure and a signal flow in the case where broadcast reception is conducted will now be described. Upon receiving a user's instruction (such as, for example, depression of a CH button on a remote controller) which indicates broadcast reception of a specific channel (CH), from the user instruction receiver 52 instructs the station selection controller 59 to conduct station selection on a CH instructed by the user (hereafter referred to as specified CH).

Upon receiving the instruction, the station selection controller 59 instructs the tuner 23 to exercise reception control in the specified CH (station selection in a specified frequency band, broadcasting signal demodulation processing, and error correction processing) and output a TS to the descrambler 24.

Then, the station selection controller 59 instructs the descrambler 24 to descramble the TS, instructs the signal changeover device 28 to output an input supplied from the descrambler 24 to the demultiplexer device 29, and instructs the demultiplexer device 29 to demultiplex the input TS, output a demultiplexed video ES to the video decoder device 30, and output an audio ES to the audio decoder device 31.

Furthermore, the station selection controller 59 instructs the decoder controller 57 to decode the video ES and the audio ES which are respectively input to the video decoder device 30 and the audio decoder device 31. Upon receiving the decoding instruction, the decoder controller 57 controls the video decoder device 30 to output the decoded video signal to the screen configuration control device 32 and controls the audio decoder device 31 to output the decoded audio signal to the audio output 42. In this way, control is exercised to output the video and audio on the CH specified by the user.

In order to display a CH banner (an OSD which displays a CH number, a program name, program information and the like) at the time of station selection, the system controller 51 instructs the OSD generator 60 to generate and output the CH banner. Upon receiving the instruction, the OSD generator 60 transmits generated data of the CH banner to the screen configuration controller 61. Upon receiving the data, the screen configuration controller 61 exercises control to superpose the CH banner on the video signal and output a resultant signal. In this way, message display at the time of station selection is conducted.

<Recording of Broadcasting Signal>

Recording control of a broadcasting signal and a signal flow will now be described. When conducting recording of a specific CH, the system controller 51 instructs the station selection controller 59 to select a specific CH and output a signal to the recording/reproducing control device 27.

Upon receiving the instruction, the station selection controller 59 instructs the tuner 23 to exercise reception control of a specified CH, instructs the descrambler 24 to descramble the MPEG2-TS received from the tuner 23, and instructs the signal changeover device 28 to output an input supplied from the descrambler 24 to the recording/reproducing control device 27, in the same way as the broadcasting reception processing.

Furthermore, the system controller 51 instructs the recording/reproducing controller 58 to record a TS which is input to the recording/reproducing control device 27. Upon receiving the instruction, the recording/reproducing controller 58 conducts necessary processing such as encryption on a signal (TS) which is input to the recording/reproducing control device 27, generate additional information required at the time of recording/reproducing (contents information such as program information and a bit rate of the recording CH), records management data (such as an ID of recording contents, a recording position on the recording medium 28, a recording form, and encryption information), and then conducts processing for writing the MPEG2-TS, additional information and management data onto the recording medium 28. In this way, recording of the broadcasting signal is conducted.

<Reproduction from Recording Medium>

Processing for reproducing data from the recording medium will now be described. When reproducing a specific program, the system controller 51 instructs the recording/reproducing controller 58 to reproduce a specific program. As an instruction at this time, the ID of the contents and a reproduction start position (such as, for example, the head of the program, a position corresponding to 10 minutes from the end, continuation from last time, or a position corresponding to 100 Mbytes from the head) are given. Upon receiving the instruction, the recording/reproducing controller 58 controls the recording/reproducing control device 27 to read out a signal (TS) from the recording medium 28 by using additional information and management data, conducts necessary processing such as decryption, then output a TS to the signal changeover device 28.

Furthermore, the system controller 51 instructs the station selection controller 59 to conduct video and audio output of a reproduced signal. Upon receiving the instruction, the station selection controller 59 controls the signal changeover device 28 to output its input from the recording/reproducing control device 27 to the demultiplexer device 29, and instructs the demultiplexer device 29 to demultiplex the input TS, output the demultiplexed video ES to the video decoder device 30 and output the demultiplexed audio ES to the audio decoder 31.

Furthermore, the station selection controller 59 instructs the decoding controller 57 to decode the video ES and the audio ES which are input respectively to the video decoder device 30 and the audio decoder device 31. Upon receiving the decoding instruction, the decoding controller 57 controls the video decoder device 30 to output the decoded video signal to the screen configuration control device 32 and controls the audio decoder device 31 to output the decoded audio signal to the audio output 42. In this way, signal reproduction processing from the recording medium is conducted.

<3D Video Display Method>

As the 3D video display method which can be used in the present invention, there are several methods for generating videos for the left eye and the right eye which cause feeling of parallax in the left eye and the right eye and causing a human being to recognize existence of a stereoscopic object.

As one method, there is an active shutter method in which left and right glasses worn by the user are intercepted from light alternately by using a liquid crystal shutter, videos for the left eye and the right eye are displayed in synchronism with the interception, and parallax is generated in images on the left and right eyes.

In this case, the receiver 4 outputs a synchronizing signal and a control signal from the control signal output part 43 and the device control signal transmission part 44 to the active shuttered glasses. Furthermore, the receiver 4 outputs a video signal from the video signal output part 41 to an external 3D video display apparatus to display a video for the left eye and a video for the right eye alternately. Or similar display is conducted on the 3D video display included in the receiver 4. By doing so, the user wearing the active shuttered glasses can view a 3D video on the 3D video display apparatus or the 3D video display included in the receiver 4.

As another method, there is a polarization method. According to the polarization method, parallax is generated between the left eye and the right eye by sticking films which are orthogonal in linear polarization to left and right glasses worn by the user, applying linear polarization coating to the left and right glasses, sticking films which are opposite in rotation direction of the polarization axis in circular polarization to the left and right glasses, or applying circular polarization coating, and simultaneously outputting a video for the left eye and a video for the right eye using polarized light corresponding to polarization of glasses for the left eye and the right eye.

In this case, the receiver 4 outputs a video signal from the video signal output part 41 to an external 3D video display apparatus. The 3D video display apparatus displays videos for the left eye and the right eye in different polarization states. Or the 3D video display included in the receiver 4 conducts similar display. By doing so, the user wearing polarization glasses can view a 3D video on the 3D video display apparatus or the 3D video display included in the receiver 4. In the polarization method, 3D video viewing becomes possible without transmitting the synchronizing signal or the control signal from the receiver 4 to the polarization glasses. Therefore, it is not necessary to output the synchronizing signal and the control signal from the control signal output part 43 and the device control signal transmission part 44.

Besides them, a color separation method in which videos for the left and right eyes are separated by colors may also be used. Furthermore, a parallax barrier method for generating a #D video by utilizing a parallax barrier which can be viewed may also be used.

By the way, the 3D display method according to the present invention is not restricted to a specific method.

<Example of Concrete Judgment Method of 3D Program Utilizing Program Information>

As an example of the 3D program judgment method, it is possible to acquire information for determining whether the program is a newly included 3D program from various tables or descriptors included in program information of a broadcasting signal and a reproduced signal already described and determine whether the program is a 3D program.

It is judged whether the program is a 3D program by checking information which identifies whether the program is a 3D program and which is newly included in the component descriptor or the component group descriptor described in a table such as the PMT or EIT [schedule basic/schedule extended/present/following], checking a 3D program detail descriptor which is a new descriptor for 3D program judgment, or checking information which identifies whether the program is a 3D program and which is newly included in the service descriptor, the service list descriptor or the like described in a table such as the NIT or SDT. These kinds of information are added to a broadcasting signal in the transmitter and transmitted. In the transmitter, the broadcasting signal is provided with these kinds of information by, for example, the management information provider 16.

As for proper use of respective tables, for example, the PMT has a feature that only information of a current program is described and consequently information of a program in the future cannot be checked, but reliability is high. On the other hand, as for the EIT [schedule basic/schedule extended], information of not only the current program but also a future program can be acquired. However, there are demerits that the time taken until reception is completed is long, a large storage area needs to be retained, and reliability is low because the EIT represents events in the future. As for EIT [following], information of a program in the next broadcasting time can be acquired and consequently it is suitable for application to the present embodiment. As for EIT [present], it can be used to acquire the current program information and information different from that of the PMT can be acquired.

A detailed example of processing in the receiver 4 which concerns program information sent from the transmitter 1 and described with reference to FIGS. 4, 6, 10, 12 and 14 will now be described.

FIG. 20 shows an example of processing conducted on each of fields in the component descriptor in the receiver 4.

If the "descriptor_tag" is "0x50," the descriptor is judged to be a component descriptor. With the "descriptor_length," the field is judged to represent a descriptor length of the component descriptor. If the "stream_content" is "0x01," the descriptor is judged to be valid (video). Unless the "stream- _content" is "0x01," the descriptor is judged to be invalid. If the "stream_content" is "0x01," then the ensuing processing is conducted.

The "component_type" is judged to be the video component type of the component. As for the component type, one of the values shown in FIG. 5 is specified. It can be determined whether the component is a component concerning a 3D video program on the basis of its contents.

The "component_tag" is a component tag value which becomes unique in the program, and it can be utilized in association with a component tag value of a stream identification descriptor in the PMT.

As for the "ISO_639_language_code," a character code disposed subsequently is handled as "jpn" even if it is not jpn ("0x6A706E")."

As for the "text_char," characters within 16 bytes (8 em characters) are judged to be component description. If this field is omitted, the field is judged to be component description of the default. A default character string is "video."

As described heretofore, the video component type which constitutes an event (program) can be judged on the basis of the component descriptor, and the component description can be utilized at the time of video component selection in the receiver.

By the way, only video components having the component_tag values which are in the range of 0x00 to 0x0F are made selection objects singly. Video components which are set with component_tag values which are other than the values do not become single selection objects, and they should not be made objects of the component selection function or the like.

Furthermore, the component description does not coincide with an actual component due to a mode change or the like in an event (program) in some cases. (The component_type in the component descriptor describes a representative component type of the component, and this value is not changed in real time in response to a mode change during in the middle of a program.)

Furthermore, the component_type described by the component descriptor is referred to when judging "maximum_bit_rate" which is a default in the case where a digital copy control descriptor which is description of information for controlling a copy generation in a digital recording device and a maximum transmission rate is omitted for the event (program).

In this way, the receiver 4 conducts the processing on respective fields of the present descriptor. This brings about an effect that a program which is now being received or which will be received in the future can be discriminated to be a 3D program by monitoring the "stream_content" and "component_type" in the receiver 4.

FIG. 21 shows an example of processing conducted on each of fields in the component group descriptor in the receiver 4.

If the "descriptor_tag" is "0x09," the descriptor is judged to be the component group descriptor. With the "descriptor_length," the field is judged to represent a descriptor length of the component group descriptor.

If the "component_group_type" is '000,' the service is judged to be the multiview TV service. If the "component_group_type" is '001,' the service is judged to be the 3D TV service.

If the "total_bit_rate_flag" is '0,' then it is judged that the total bit rate in the group in the event (program) is not described in the descriptor. If the "total_bit_rate_flag" is '1,' then it is judged that the total bit rate in the group in the event (program) is described in the descriptor.

The "num_of_group" is judged to be the number of component groups in the event (program). A maximum value exists, and if the number of groups exceeds the maximum value, there is a possibility that it will be processed as the maximum value.

If the "component_group_id" is "0x0," the component group is judged to be the main group. Unless the "component_group_id" is "0x0," the component group is judged to be a subgroup.

The "num_of_CA_unit" is judged to be the number of accounting/nonaccounting units in the component group. If the number of accounting/nonaccounting units exceeds a maximum value, there is a possibility that it will be processed as 2.

If the "CA_unit_id" is "0x0," the accounting unit is judged to belong to the nonaccounting unit group. If the "CA_unit_id" is "0x1," the accounting unit is judged to be an accounting unit including a default ES group. If the "CA_unit_id" is neither "0x0" nor "0x1," the accounting unit is judged to be other than the accounting units.

The "num_of_component" is judged to be the number of components which belong to the component group and which belong to the accounting/nonaccounting unit indicated by the immediately preceding "CA_unit_id." If the number of components exceeds the maximum value, there is a possibility that it will be processed as 15.

The "component_tag" is judged to be a component tag value belonging to the component group, and the "component_tag" can be utilized in association with the component tag value of the stream identification descriptor in the PMT.

The "total_bit_rate" is judged to be the total bit rate in the component group. If the "total_bit_rate" is "0x00," however, it is judged to be a default.

If the "text_length" is 16 (8 em characters) or less, it is judged to be the component group description length. If the "text_length" is greater than 16 (8 em characters), a description statement corresponding to an excess of the component group description length over 16 (8 em characters) may be neglected.

The "text_char" indicates a description statement concerning the component group. By the way, on the basis of disposition of a component group descriptor having "component_group_type"='000, it is judged that the multiview TV service is conducted in the event (program) and the judgment can be utilized in processing of each component group.

On the basis of disposition of a component group descriptor having "component_group_type"='001, it is judged that the 3D TV service is conducted in the event (program) and the judgment can be utilized in processing of each component group.

In addition, a default ES group in each group is described in a component group disposed at the top of the "CA_unit" loop without fail.

In the main group (component_group_id=0x0):
if the default ES group in the group is a nonaccounting object, then "free_CA_mode=0" should be set, and a component group having "CA_unit_id=0x1" should not be set; and
if the default ES group in the group is an accounting object, then "free_CA_mode=1" should be set, and a component group having "CA_unit_id=0x1" should be set and described without fail.

In a subgroup (component_group_id>0x0):
only the same accounting unit or nonaccounting unit as that of the main group can be set for the subgroup;
if the default ES group in the group is a nonaccounting object, then a component group having "CA_unit_id=0x0" should be set and described; and if the default ES group in the group is an accounting object, then a component group having "CA_unit_id=0x1" should be set and described.

In this way, the receiver 4 conducts the processing on respective fields of the present descriptor. This brings about an effect that a program which is now being received or which will be received in the future can be discriminated to be a 3D program by monitoring "component_group_type" in the receiver 4.

FIG. 22 shows an example of processing conducted on each of fields in the 3D program detail descriptor in the receiver 4.

If the "descriptor_tag" is "0xE1," the descriptor is judged to be the 3D program detail descriptor. With the "descriptor_length," the field is judged to represent a descriptor length of the 3D program detail descriptor.

The "3D_method_type" is judged to be the 3D method type in the 3D program, which is specified in accordance with FIG. 11.

The "stream_type" is judged to be the ES form of the 3D program in accordance with FIG. 3. The "component_tag" is judged to be the component tag value which becomes unique in the 3D program. The component tag value can be utilized in association with the component tag value of the stream identification descriptor in the PMT.

By the way, a configuration in which it is judged whether the program is a 3D video program on the basis of whether there is the 3D program detail descriptor itself may be used. In other words, if there isn't the 3D program detail descriptor, the program is judged to be a 2D video program. If there is the 3D program detail descriptor, the program is judged to be a 3D video program.

In this way, the receiver 4 conducts the processing on respective fields of the present descriptor. This brings about an effect that a program which is now being received or which will be received in the future can be discriminated to be a 3D program if there is the 3D program detail descriptor by monitoring the 3D program detail descriptor in the receiver 4.

FIG. 23 shows an example of processing conducted on each of fields in the service descriptor in the receiver 4. If the "descriptor_tag" is "0x48," the descriptor is judged to be the service descriptor. On the basis of the "descriptor_length," the field is judged to be the descriptor_length of the service descriptor. If the "service_type" is other than "service_type"s shown in FIG. 13, the descriptor is judged to be invalid.

In the case of the BS/CS digital TV broadcasting reception, the "service_provider_name_length" is judged to be a service provider name length if it is equal to 20 or less and it is judged to invalid if it is greater than 20. On the other hand, in the case of terrestrial digital TV broadcasting reception, the "service_provider name length" is judged to be invalid if it is other than "0x00."

The "char" is judged to be a service provider name in the case of BS/CS digital TV broadcasting reception. On the other hand, contents of description are neglected in the case of terrestrial digital TV broadcasting reception. If the "service_name_length" is equal to or less than 20, it is judged to be a service name. If the "service_name_length" is greater than 20, the service name is judged to be invalid.

The "char" is judged to be a service name. By the way, if an SDT having the descriptor disposed in accordance with the example of the sending operation rule described above with reference to FIG. 18 cannot be received, then basic information of the object service is judged to be invalid.

In this way, the receiver 4 conducts the processing on respective fields of the present descriptor. This brings about an effect that the service can be discriminated to be a channel of a 3D program by monitoring the "service_type" in the receiver 4.

FIG. 24 shows an example of processing conducted on each of fields in the service list descriptor in the receiver 4. If the "descriptor_tag" is "0x41," the descriptor is judged to be the service list descriptor. On the basis of the "descriptor_length," the field is judged to be the descriptor_length of the service list descriptor.

The "loop" describes as many loops as the number of services included in the object transport stream. The "sevice_id" is judged to be "sevice_id" for the transport stream. The "sevice_type" indicates a service type of the object service. Service types other than those prescribed in FIG. 13 are judged to be invalid.

As described heretofore, the service list descriptor can be judged to be information of a transport stream included in the object network.

In this way, the receiver 4 conducts the processing on respective fields of the present descriptor. This brings about an effect that the service can be discriminated to be a channel of a 3D program by monitoring the "service_type" in the receiver 4.

Concrete descriptors in each table will now be described. First, the form of the ES can be judged on the basis of the kind of data in the stream_type described in the 2nd loop of the PMT as described above with reference to FIG. 3. If description indicating that the stream which is now being broadcasted is a 3D video exists therein, however, the program is judged to be a 3D program (for example, an MVC video stream prescribed by ITU-T recommendations H.264 ISO/IEC 14496 video (the so-called "H.264 MVC" stream) which indicates that the stream is a multiple viewpoint video coded stream is assigned to 0x1F and it is confirmed that the value exists in the program information.

As for an area which is now reserved in the PMT besides the stream_type, it is possible to newly assign a 2D/3D identification bit which identifies a 3D program or a 2D program to the area and judge on the basis of the area.

As for the EIT as well, it is also possible to newly assign a 2D/3D identification bit to the reserved area and judge in the same way.

In the case where a 3D program is judged on the basis of the component descriptor disposed in the PMT and/or the EIT, it is possible to assign a type which indicates a 3D video to the component_type in the component descriptor as described above with reference to FIG. 4 and FIGS. 5A to 5E (for example, FIGS. 5C to 5E) and judge the program to be a 3D program of there is a descriptor in which the component_type indicates a 3D video. (For example, assignment is conducted in accordance with FIGS. 5C to 5E and it is confirmed that its value exists in program information of an object program.)

According to a judgment method based on the component group descriptor disposed in the EIT, description which represents a 3D service is assigned to the value of the "component_group_type" as described above with reference to FIGS. 6 and 7. If the value of the "component_group_type" represents the 3D service, the program can be discriminated to be a 3D program (for example, the 3D TV service or the like is assigned to a bit field 001 and it is confirmed that the value exists in the program information of the object program).

As for a judgment method based on the 3D program detail descriptor disposed in the PMT and/or the EIT, it can be first judged whether an object program is a 3D program on the basis of whether the descriptor exists as described above with reference to FIGS. 10 and 11. In that case, it is not necessary to analyze the descriptor, and consequently the processing is easy. If the 3D method type (the 3d_method_type) included in the descriptor is a 3D method that the receiver can cope with, the next program is judged to be a 3D program. Such a method is also conceivable. In that case, analysis processing of the descriptor becomes complicated. However, it becomes possible to suspend an operation for conducting message display processing and recording processing on a 3D program that the receiver cannot cope with.

It is possible to assign the 3D video service to "0x11" in the "service_type" information included in the service descriptor disposed in the SDT or the service list descriptor disposed in the NIT as described above with reference to FIGS. 12, 13 and 14 and judge a program to be a 3D program when its program information having the descriptor is acquired. In this case, judgment is not conducted by taking a program as the unit, but judgment is conducted by taking service (CH, service) as the unit. Judgment whether the next program in the same service is a 3D program cannot be conducted. However, there is a merit that information acquisition is easy because a program is not taken as the unit.

As for the program information, there is also a method of acquiring it through a dedicated communication path (a broadcasting signal or the Internet). In that case as well, the 3D program judgment can be conducted in the same way if there are program start time, CH (broadcasting service, URL or an IP address), and an identifier which represents whether the program is a 3D program.

In the foregoing description, various kinds of information (information included in tables or descriptors) for determining whether a video is a 3D video by taking a service (CH) or a program as the unit have been described. In the present invention, however, it is not always necessary to transmit all of them, but necessary information may be transmitted according to the broadcasting form. Judgment whether the video is a 3D video may be conducted with a service (CH) or a program taken as the unit by checking respective single information pieces. Or the determination whether the video is a 3D video may be conducted with a service (CH) or a program taken as the unit by combining a plurality of kinds of information. In the case where judgment is conducted by combining a plurality of kinds of information, for example, a judgment that the service is the 3D video broadcasting service, but only some programs are 2D videos also becomes possible. In the case where such a judgment can be conducted, the receiver can express clearly that the service is the "3D video broadcasting service" in, for example, the EPG. In addition, even if 2D video programs are mixedly present in the service besides 3D video programs, it becomes possible to change over the display control according to whether the program is a 3D video program or a 2D video program when the program is received.

It is now supposed that a program is judged to be a 3D program according to the 3D program judgment method described heretofore. If in this case a 3D component specified in, for example, FIGS. 5C to 5E can be processed (displayed and output) suitably in the receiver 4, the 3D component is processed (reproduced, displayed and output) in the 3D. If the 3D component cannot be processed (reproduced, displayed and output) suitably in the receiver 4 (as in the case where, for example, the receiver 4 is not provided with a 3D video reproduction function which corresponds to a specified 3D transmission method), the 3D component may be processed (reproduced, displayed and output) in the 2D. At this time, a message that the 3D video program cannot be subject to 3D display or 3D output suitably in the receiver may be displayed together with the display and output of a 2D video. By doing so, the user can grasp whether the program is a program broadcasted as a 2D video program, or the program is a program broadcasted as a 3D video program, but a 2D video is displayed because it cannot be processed suitably in the receiver.

<Display Processing of 3D Contents>

Processing conducted when reproducing 3D contents (digital contents including a 3D video) will now be described. As an example, it is supposed that there are a video ES for left eye and a video ES for right eye in one TS. First, the user gives an instruction of changeover to a 3D video (for example, the user depresses a "3D" key on a remote controller). Upon receiving the key code, the user instruction receiver 52 instructs the system controller 51 to change over to a 3D video. Upon receiving the instruction, the system controller 51 determines whether the current program is a 3D program according to the above described method.

If the current program is a 3D program, the system controller 51 first instructs the station selection controller 59 to output a 3D video. Upon receiving the instruction, the station selection controller 59 acquires PIDs (packet IDs) and a 3D coding method (for example, the H264 MVC) of a video ES for left eye and a video ES for right eye from the program information analyzer 54 and then controls the demultiplexer device 29 to demultiplex the TS to the video ES for left eye and the video ES for right eye and output them to the video decoder device 30.

Here, the station selection controller 59 controls the demultiplexer device 29 to input the video ES for left eye to a first input of the video decoder device 30 and input the video ES for right eye to a second input of the video decoder device 30. Then the station selection controller 59 transmits information which indicates that the first input of the video decoder device 30 is the video ES for left eye and the second input of the video decoder device 30 is the video ES for right eye and the 3D coding method to the decoding controller 57. And the station selection controller 59 instructs the decoding controller 57 to decode the ESs.

Upon receiving the instruction, the decoding controller 57 decodes the ES for left eye and the ES for right eye, and outputs video signals for left eye and right eye to the screen configuration control device 32. At this time, the system controller 51 instructs the screen configuration controller 61 to conduct 3D output of the video. Upon receiving the instruction from the system controller 51, the screen configuration controller 61 outputs the video signals for left eye and right eye from the video signal output part 41 alternately or displays a video on the 3D video display included in the receiver 4.

Together therewith, a synchronizing signal which makes the video signal for left eye and the video signal for right eye distinguishable is output from the control signal output part 43. Upon receiving the video signal and the synchronizing signal, an external video output device outputs videos for left eye and right eye in accordance with the synchronizing signal and transmits the synchronizing signal to a 3D viewing assistance device. As a result, it becomes possible to conduct 3D display.

When displaying the video signal on the 3D video display included in the receiver included in the receiver 4, the synchronizing signal is output from the device control signal transmission part 44 via the device control signal transmitter 53 and the control signal transceiver 33 to exercise control (fir example, interception changeover of an active shutter) on the external 3D viewing assistance device. As a result, 3D display is conducted.

When conducting 2D display, the user gives an instruction of changeover to a 2D video (for example, the user depresses a "2D" key on the remote controller). Upon receiving the key code, the user instruction receiver 52 instructs the system controller 51 to change over to a 3D video. Upon receiving the instruction, the system controller 51 first instructs the station selection controller 59 to output a 2D video.

Upon receiving the instruction, the station selection controller 59 first acquires a PID of an ES (for example, an ES having a default tag) for 2D video from the program information analyzer 54, and instructs the demultiplexer device 29 to output the ES to the video decoder device 30. Then, the station selection controller 59 instructs the decoding controller 57 to decode the ES.

Upon receiving the instruction, the decoding controller 57 decodes the ES and outputs the video signal to the screen configuration control device 32. At this time, the system controller 51 instructs the screen configuration controller 61 to conduct 2D output of the video. Upon receiving the instruction from the system controller 51, the screen configuration controller 61 outputs the video signal which is input to the screen configuration control device 32, from the video signal output part 41. In this way, 2D display is conducted.

Display processing of 3D contents under predetermined conditions will now be described. As for viewing of 3D contents, it is now supposed that the user is not in a state in which the user views 3D contents. If display of 3D contents is started in spite of this state, the user cannot view the contents in the best state and there is a fear that convenience of the user will be hampered. On the other hand, the convenience of the user can be improved by conducting processing described hereafter.

Figure 27:
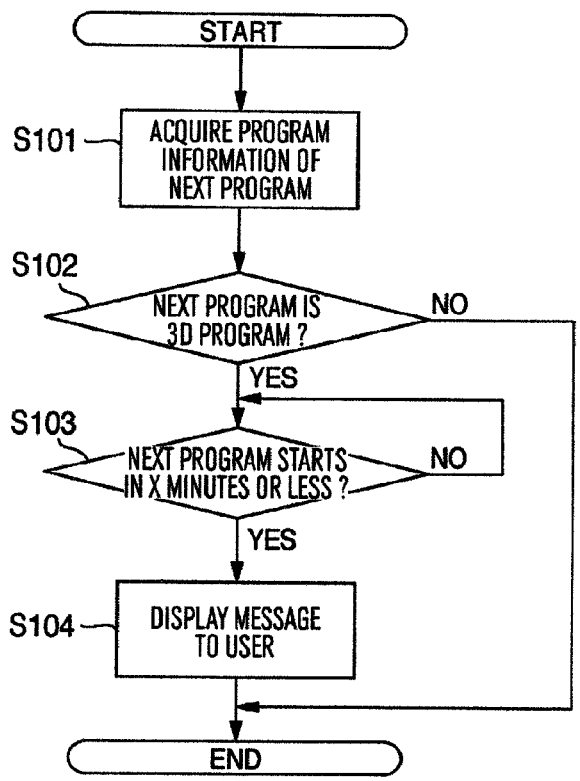
FIG. 27 shows an example of a flow chart of a system controller.

FIG. 27 shows an example of a flow executed by the system controller 51 in the case where time left until start of the next program is changed due to station selection or elapse of a definite time. First, the system controller 51 acquires program information of the next program from the program information analyzer 54 (S101), and determines whether the next program is a 3D program according to the 3D program judgment method described above.

If the next program is not a 3D program (no at S102), processing is not conducted especially and the flow is finished. If the next program is a 3D program (yes at S102), time left until start of the next program is calculated. Specifically, the start time of the next program or end time of the current program is acquired from the acquired EIT of the program information, the current time is acquired from the time manager 55, and a difference between them is calculated.

Unless the next program starts in X minutes or less (no at S103), X minutes before the start of the next program is waited without conducting especial processing. If the next program starts in X minutes or less (yes at S103), a message that a 3D program will be started soon is displayed to the user (S104).

Figure 28:
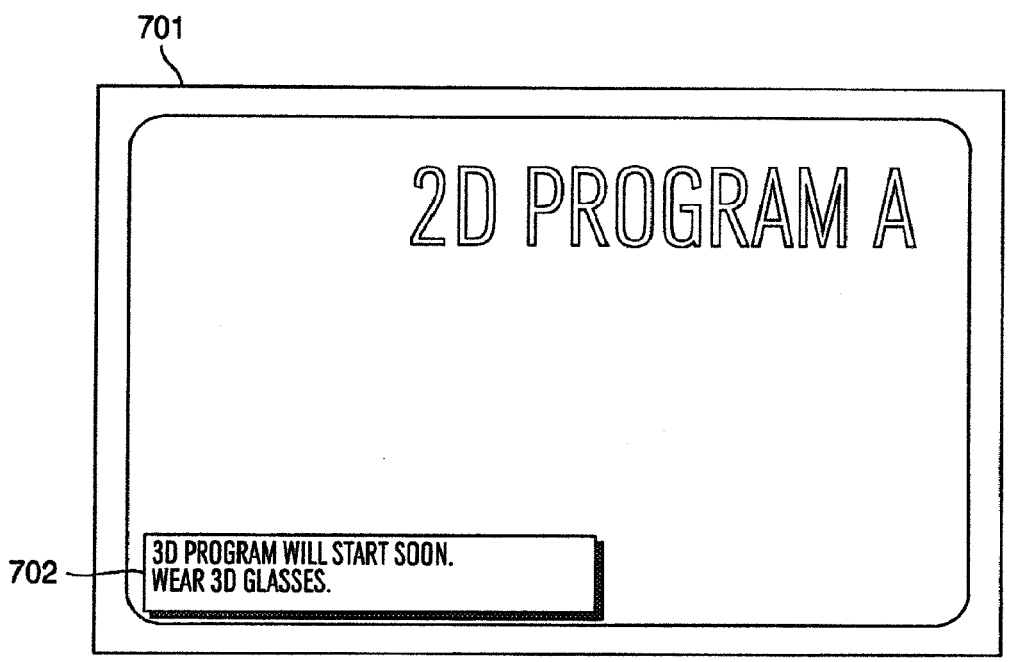
FIG. 28 shows an example of message display.

FIG. 28 shows an example of message display at that times. Reference numeral 701 shows the whole screen displayed by the apparatus, and reference numeral 702 denotes a message displayed by the receiver. In this way, it becomes possible to call attention of the user to prepare a 3D viewing assistance device.

If the judgment time X lasting until the program start is made short, there is a possibility that the user will not be ready for 3D viewing by the time the program starts. If X is made long, there is a demerit that message display becomes an obstacle to viewing for a long time and there is a pause after the completion of the preparation. Therefore, it is necessary to adjust the judgment time X to a suitable time.

Figure 29:
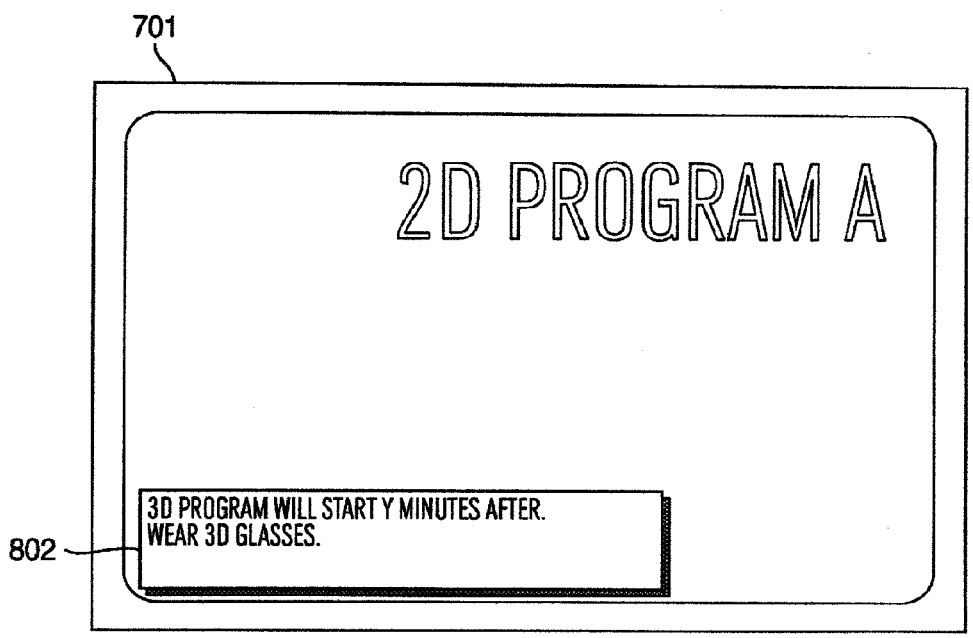
FIG. 29 shows an example of message display.

When displaying a message to the user, the start time of the next program may be displayed concretely. An example of screen display in that case is shown in FIG. 29. Reference numeral 802 denotes a message which displays a time left until the 3D program start. Although the time is represented in minutes, the time may be represented in seconds. In that case, the user can know more detailed start time of the next program. However, there is also a demerit that the processing load becomes high.

The example in which the time left until a 3D program is started is displayed is shown in FIG. 29. Alternatively, the time at which the 3D program is started may be displayed. If the 3D program is to be started at 9 p.m., then, for example, a message "3D program will be started at 9 p.m. Wear 3D glasses" may be displayed.

By displaying such a message, it becomes possible for the user to know concrete start time of the next program and prepare for 3D viewing at a suitable pace.

Figure 30:
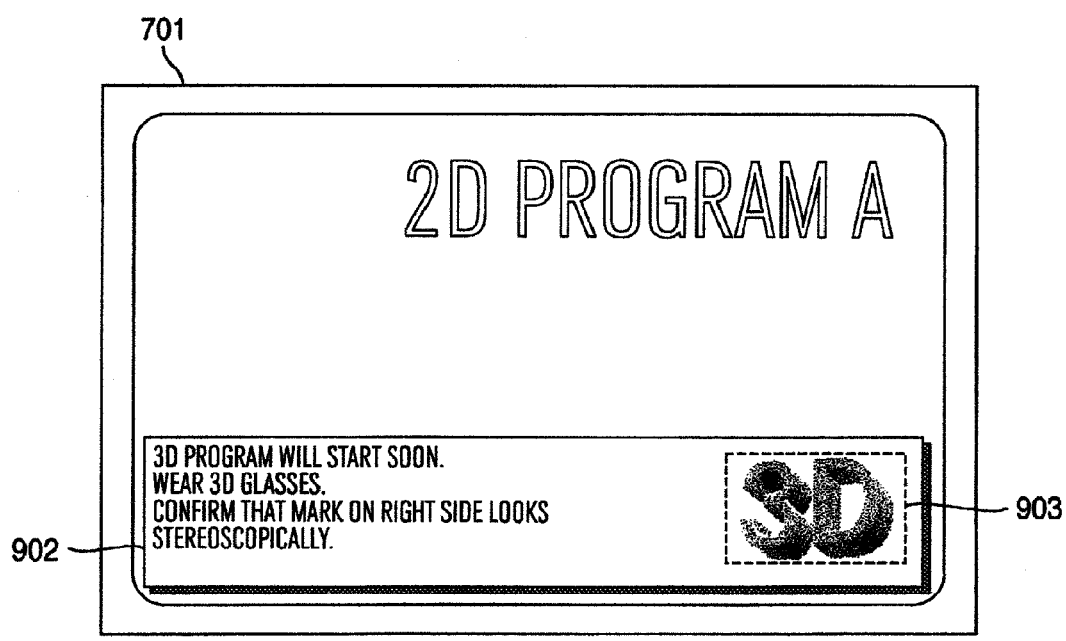
FIG. 30 shows an example of message display.

When using a 3D viewing assistance device, it is also conceivable to add a mark which looks stereoscopically (3D check mark) as shown in FIG. 30. Reference numeral 902 denotes a message which gives an advance notice indicating the start of a 3D program, and reference numeral 903 denotes a mark which looks stereoscopically when using a 3D viewing assistance device. Owing to the mark, it is possible for the user to confirm normal operation of the 3D viewing assistance device before the start of the 3D program. For example, when a trouble (such as, for example, a dead battery or a failure) has occurred in the 3D viewing assistance device, it becomes possible to cope with the trouble by repair or exchange by the time the program starts.

A method for notifying the user that the next program is 3D, then determining whether the user's preparation for 3D viewing is complete (3D viewing preparation state), and changing over the video of the 3D program to 2D display or 3D display will now be described.

Figure 31:
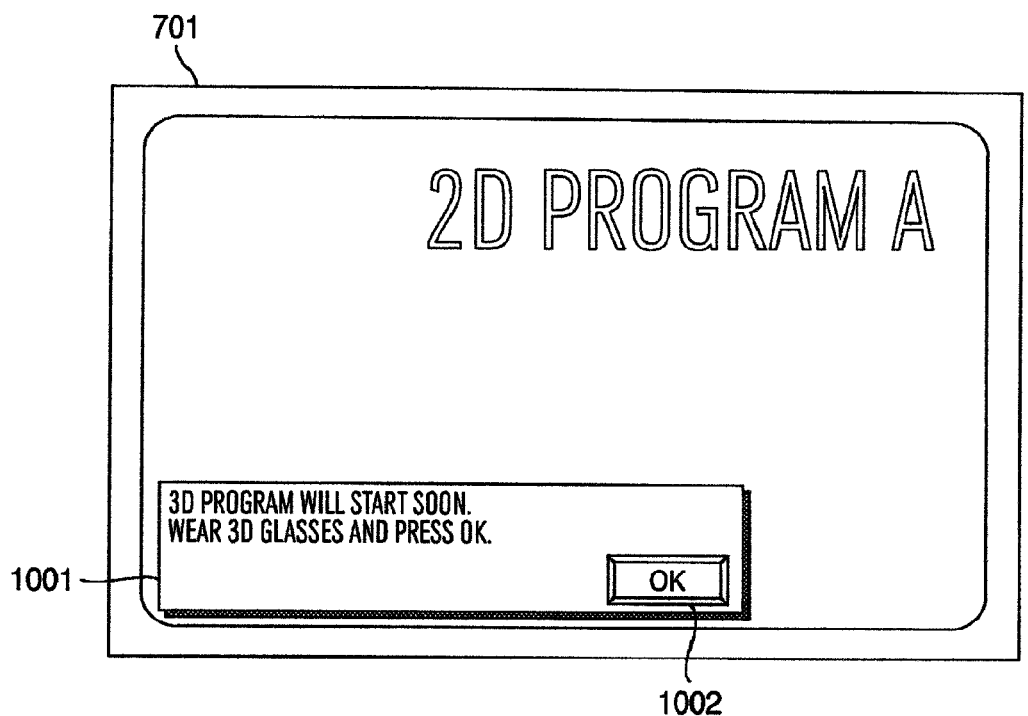
FIG. 31 shows an example of message display.

The method for notifying the user that the next program is 3D is the same as the above-described method. However, the method is different in that an object to be used by the user to respond (which is hereafter referred to as user response reception object, and which is, for example, a button on the OSD) is displayed in the message given to the user at the step S104. An example of this message is shown in FIG. 31.

Reference numeral 1001 denotes the whole message, and reference numeral 1002 denotes a button to be used by the user to respond. If the user depresses, for example, an "OK" button on the remote controller when the message 1001 shown in FIG. 31 is displayed, the user instruction receiver 52 notifies the system controller 51 that "OK" has been depressed.

Upon receiving the notice, the system controller 51 stores that the user's 3D viewing preparation state is OK as a state. Then, time elapses and the current program becomes the 3D program. A processing flow of the system controller 51 in this case will now be described with reference to FIG. 32.

The system controller 51 acquires program information of the current program from the program information analyzer 54 (S201), and determines whether the current program is a 3D program according to the above-described 3D program judgment method. Unless the current program is a 3D program (no at S202), control is exercised to display the video in 2D according to the above-describe method (S203).

If the current program is a 3D program (yes at S202), then the 3D viewing preparation state of the user is confirmed (S204). Unless the 3D viewing preparation state stored by the system controller 51 is OK (no at S205), control is exercised to conduct 2D display of the video in the same way (S203).

If the 3D viewing preparation state is OK (yes at S205), control is exercised to conduct 3D display of the video according to the above described method (S206). If it can be confirmed that the current program is a 3D program and the 3D viewing preparation of the user is complete in this way, 3D display of the video is conducted.

Figure 33:
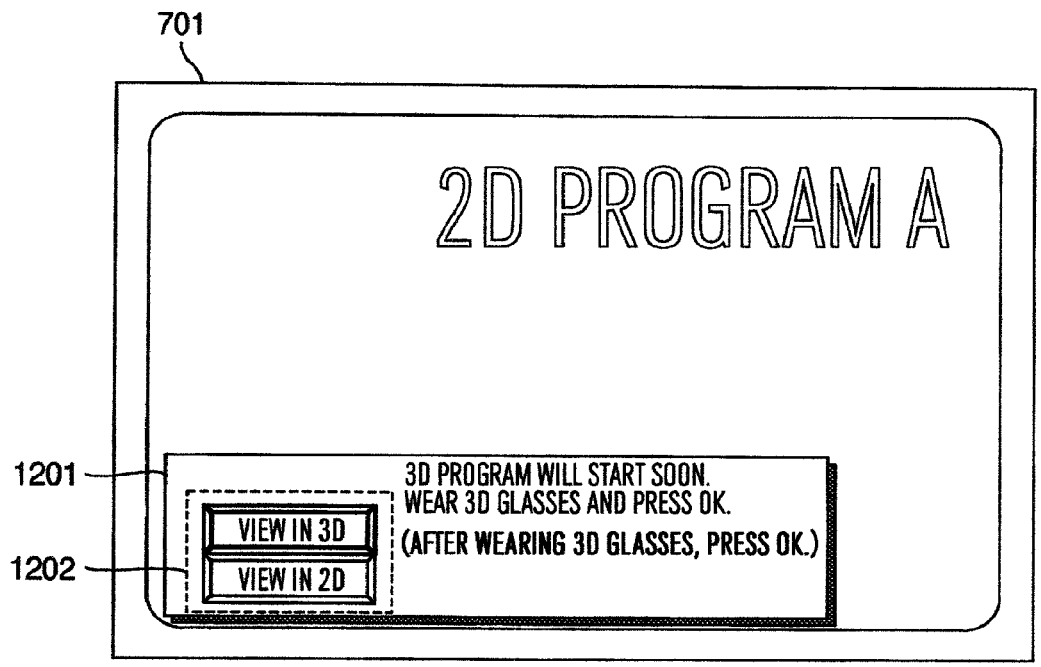
FIG. 33 shows an example of message display.
Figure 34:
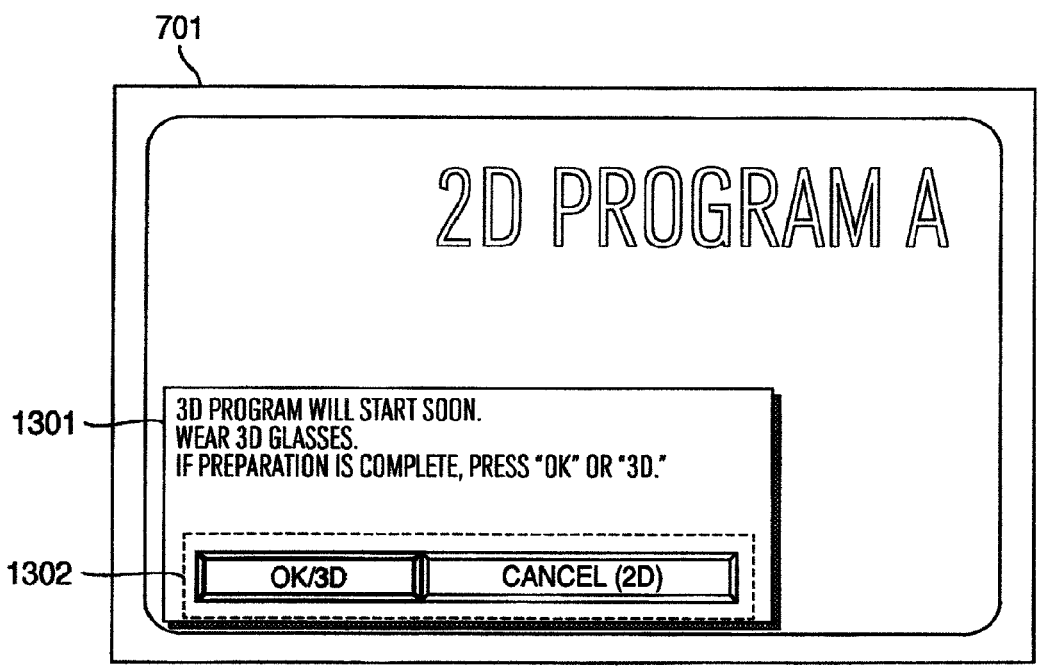
FIG. 34 shows an example of message display.

As for the message display at the step S104, not only simple "OK" as shown in FIG. 31, but also a method of stating expressly whether to display the next program in 2D video or 3D video is also conceivable. Examples of a message and a user response reception object in that case are shown in FIGS. 33 and 34.

By doing so, the user can judge operation to be conducted after depressing a button more easily as compared with the display of "OK" described above. In addition, display in 2D can be instructed expressly (when "view in 2D" described in 1202 is depressed, the user's 3D viewing preparation state is judged to NG). In this way, the convenience is improved.

Furthermore, the user's judgment of the 3D viewing preparation state is conducted by operation of user menu on the remote controller. Besides, however, there is a method of judging the 3D viewing preparation station on the basis of, for example, a user wearing completion signal originated by a 3D viewing assistance device. Or it is also possible to take a photograph of the use's viewing state by suing an image pickup device, conduct image recognition and user's face recognition on the basis of a result of the photographing, and determine whether the user wears a 3D viewing assistance device.

By conducting judgment in this way, it becomes possible to eliminate the labor required for the user to conduct some operation on the receiver. In addition, it becomes possible to prevent 2D video viewing and 3D video viewing from being set falsely by erroneous operation.

Furthermore, as another method, there is also a method of judging the 3D viewing preparation state to be OK when the user has depressed a <3D> button on the remote controller and judging the 3D viewing preparation state to be NG when the user has depressed a <2D> button, a <return> button or a <cancel> button on the remote controller. In this case, the user can notify the receiver of the user's state clearly and easily. However, a demerit such as state transmission caused by false operation or misunderstanding is also conceivable.

Figure 32:
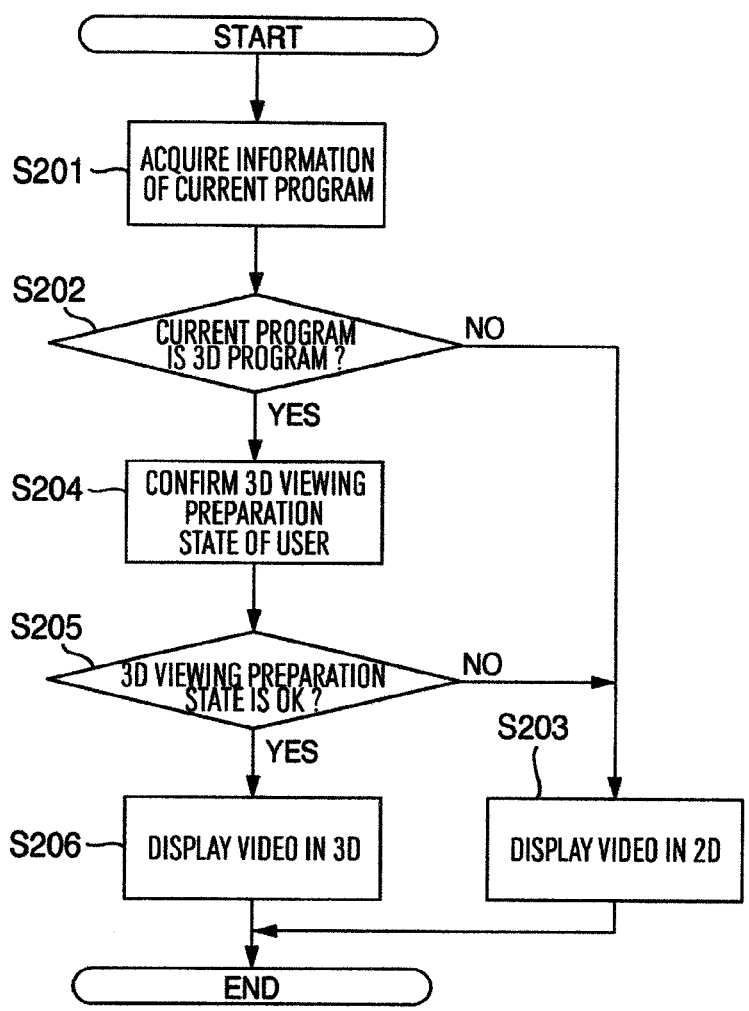
FIG. 32 shows an example of a flow chart of a system controller at the time of start of the next program.

Furthermore, it is also conceivable in the above-described example to judge only program information of the next program acquired previously and conduct processing without acquiring information of the current program. In this case, a method of using program information acquired previously (for example, at step S101 shown in FIG. 27) without conducting determination whether the current program is a 3D program at the step S201 shown in FIG. 32 is also conceivable. In this case, merits such as a simplified processing structure are conceivable. However, there is a demerit such as a possibility that 3D video changeover processing will be executed even in the case where a program configuration is changed suddenly and the next program does not become a 3D program.

Figure 35:
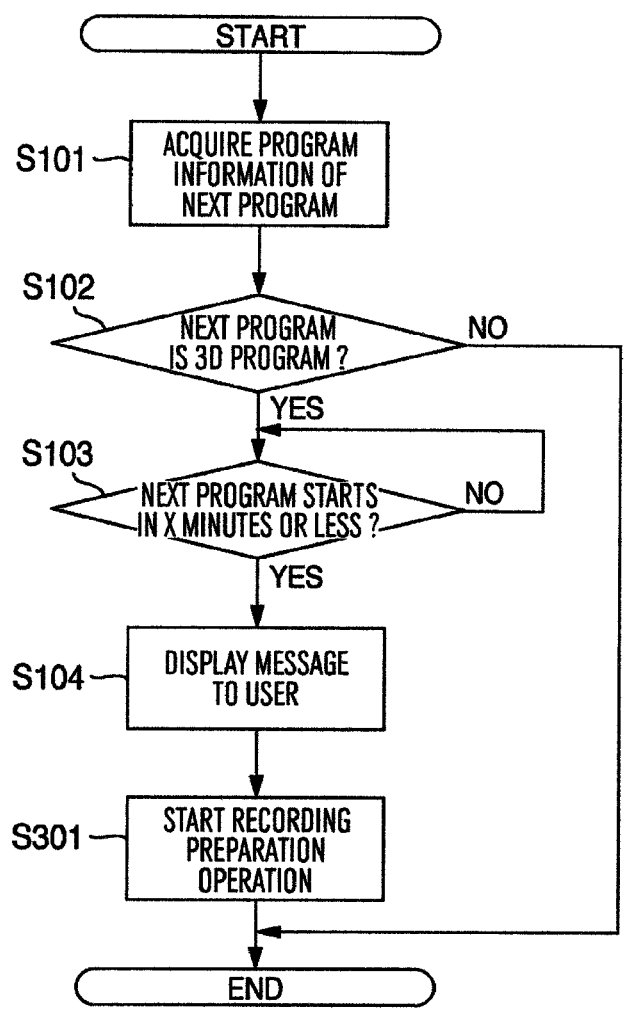
FIG. 35 shows an example of a flow chart of a system controller before start of a program.

A processing flow of the system controller 51 in the case where picture recording is started when a 3D program is started and it is made possible for the user to view the program from its beginning at the time when the user has completed preparation of the 3D program viewing will now be described. Processing conducted before the 3D program starts is shown in FIG. 35. Steps S101 to S104 shown in FIG. 35 are the same as those shown in FIG. 27. However, FIG. 35 differs from FIG. 27 in that step S301 is added.

As for concrete operation, recording preparation operation is started (S301) if the next program is a 3D program (yes at S102) and the next program starts in X minutes or less (yes at S103). As for the recording preparation operation, it is desirable to execute operations which become preparation stages for recording, such as, for example, HDD standby state canceling, spin up operation, signal changeover start for recording, or execution of station selection for recording, at this step.

Figure 36:
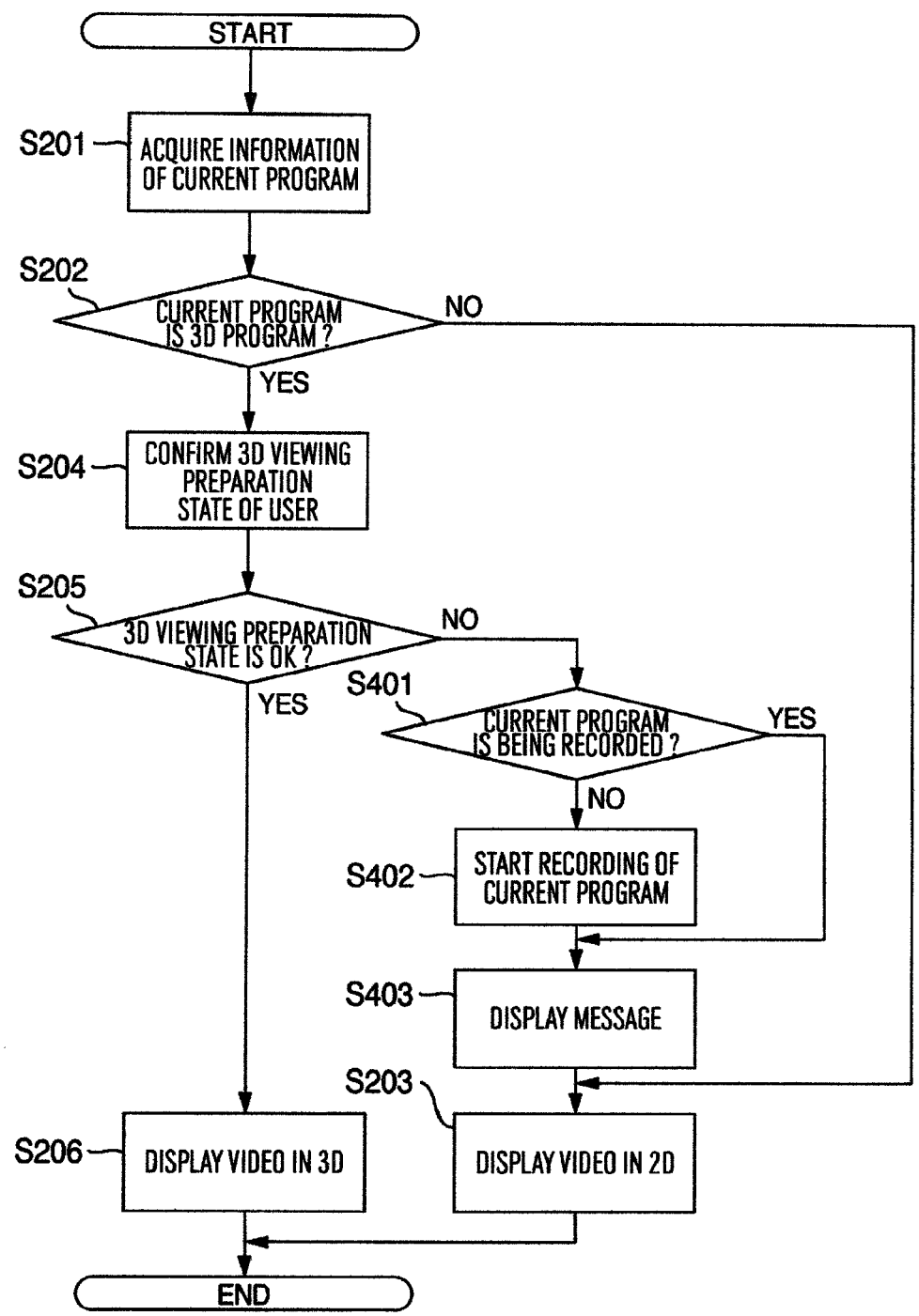
FIG. 36 shows an example of a flow chart of a system controller after start of a program.

A processing flow of the system controller 51 subsequent to start of the 3D program is shown in FIG. 36. The processing flow is similar to that shown in FIG. 32 until the 3D viewing preparation state of the user is judged (S201, S202, S204 and S205).

Unless the 3D viewing preparation state is OK thereafter (no at S205), it is judged whether the current program is being recorded. Unless the current program is being recorded (no at S401), recording the current program is started (S402). If the current program is being recorded (yes at S401), the flow proceeds to the next step without conducting processing especially.

After recording control has been exercised, the system controller 51 displays a message 1601 that a 3D program has been started and the user should select a subsequent operation to the user (S403), changes over the video to 2D display (S203), and finishes the processing.

Figure 37:
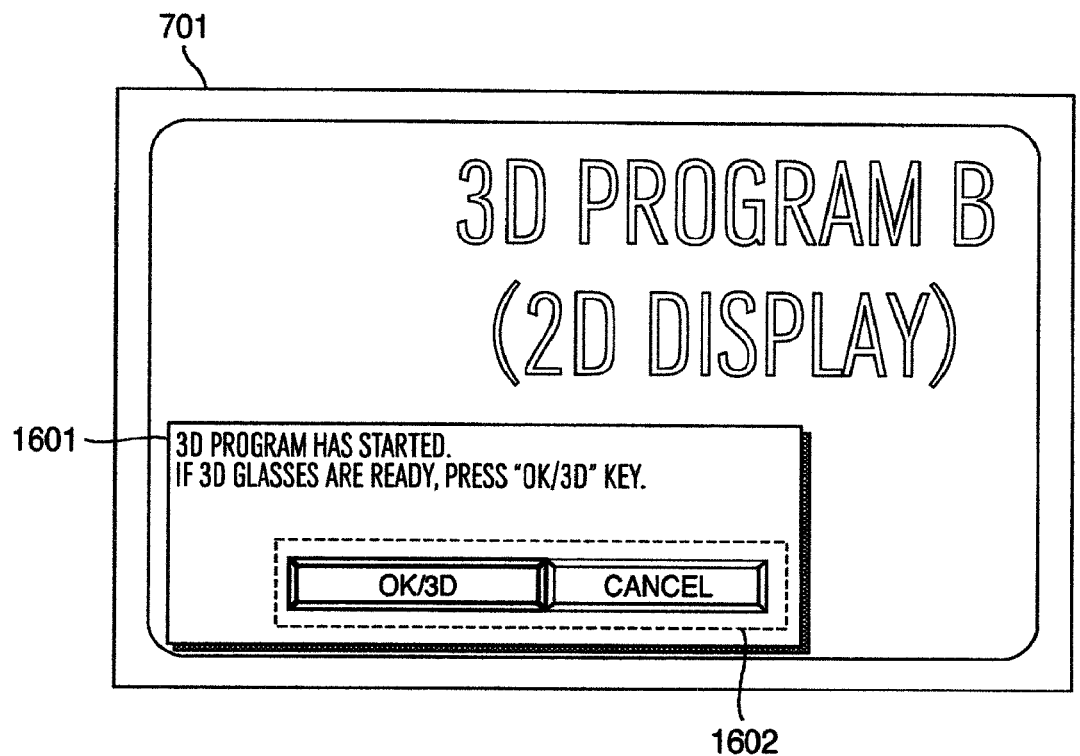
FIG. 37 shows an example of message display.

As for an example of user selection judgment method in screen display shown in FIG. 37, if the user operates a remote controller and depresses a <3D> button on the remote controller or if the user puts the cursor upon "OK/3D" on the screen and depresses an <OK> button on the remote controller, the user selection is judged to be "3D changeover."

Or if the user depresses the <cancel> button or the <return> button on the remote controller, or if the user puts the cursor upon "cancel" on the screen and depresses the <OK> on the remote controller, then user selection is judged to be "other than 3D changeover." Besides this, if, for example, an operation which brings the 3D viewing preparation state to OK (such as wearing of 3D glasses), the user selection becomes "3D changeover."

Figure 38:
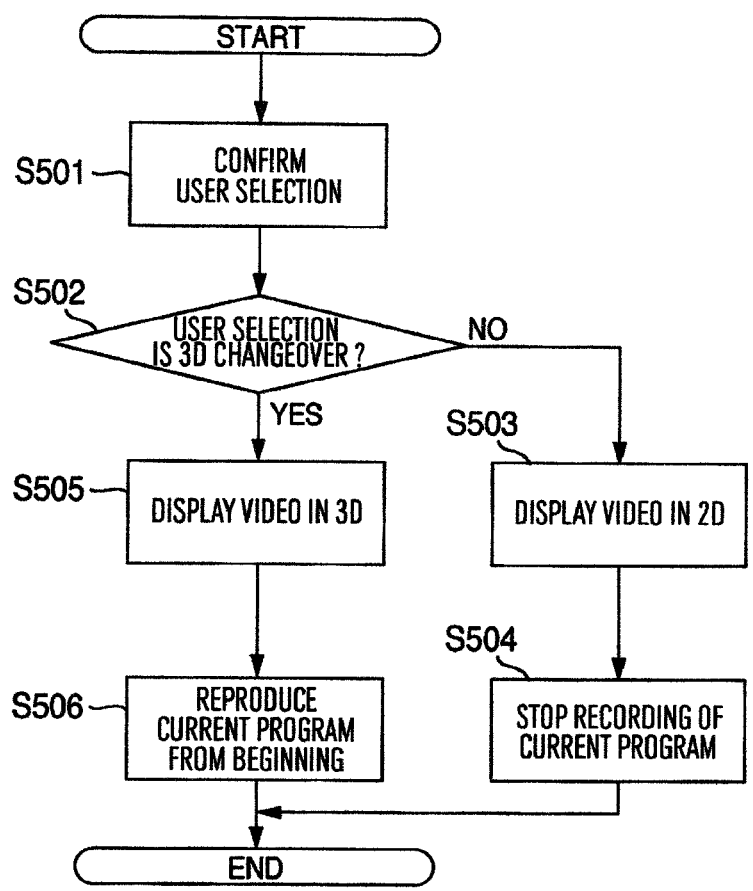
FIG. 38 shows an example of a flow chart of a system controller after user's selection.

A flow of processing executed by the system controller 51 after the user has conducted the selection is shown in FIG. 38. The system controller 51 acquires a result of the user selection from the user instruction receiver 52 (S501). Unless the user selection is "3D changeover" (no at S502), the system controller 51 conducts 2D display of a video (S503). If the current program is being recorded, then the system controller 51 stops the recording (S504) and finishes the processing as it is.

If the user selection is "3D changeover" (yes at S502), the system controller 51 conducts 3D display of a video (S505) and executes reproduction processing from the recording medium to reproduce the current program from its beginning (S506).

Even if the user has not completed the 3D viewing preparation when starting program reproduction, it becomes in this way possible to view the program in 3D from its beginning after the user has completed the 3D viewing preparation.

Figure 39:
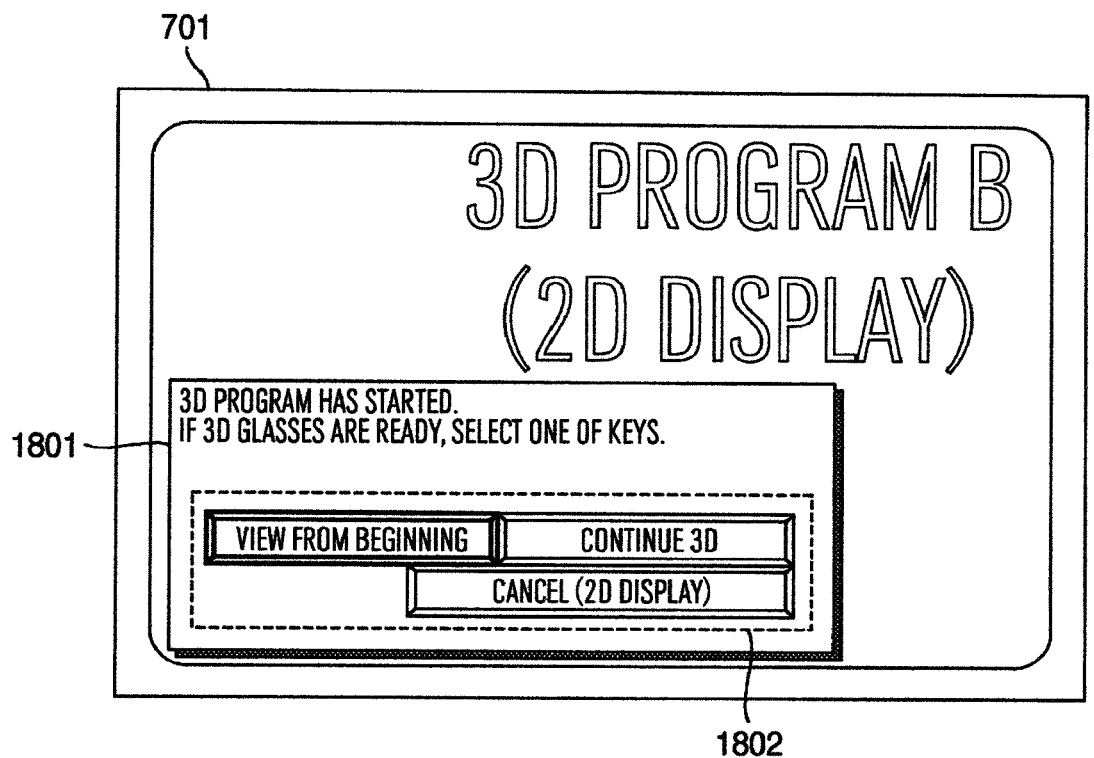
FIG. 39 shows an example of message display.

Furthermore, it becomes possible to expressly increase operations which can be selected by the user by providing a message "continue 3D" denoted by 1801 in FIG. 39, as the message displayed at S403. In an example of the user selection judgment method in this case, the user selection is judged to be "3D changeover and viewing from beginning," if the user operates the remote controller, puts the cursor upon "viewing from beginning" on the screen and depresses the <OK> button on the remote controller.

If the user puts the cursor upon "continue 3D" on the screen and depresses <OK> on the remote controller, the user selection is judged to be "3D changeover and continuation of the viewing." If the user puts the cursor upon "cancel (2D display)" on the screen and depresses <OK> on the remote controller, the user selection is judged to be "2D changeover."

Figure 40:
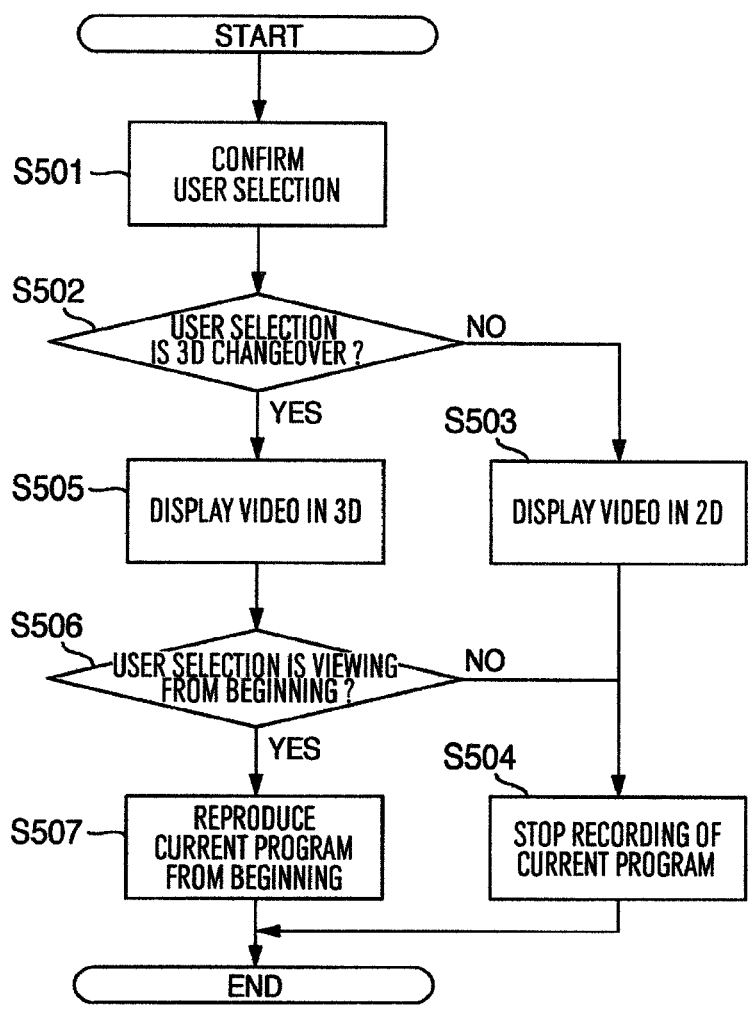
FIG. 40 shows an example of a flow chart of a system controller after user's selection.

A flow of processing executed by the system controller 51 after the user has conducted the selection in this case is shown in FIG. 40. Operations conducted at steps S501 to S505 are similar to those in FIG. 38. If the user selection is "3D changeover" (yes at S502), the system controller 51 displays the video in 3D (S505) and then determines whether the user selection is viewing from the beginning.

If the user selection is viewing from the beginning (yes at S506), reproduction processing from the recording medium is executed to reproduce the current program from its beginning (S507). Unless the user selection is viewing from the beginning (no at S506), recording of the current program is stopped (S504) and reproduction is conducted from the continuation.

In this way, it is possible to select whether the user views the program in 3D from the current continuation, the user views the program in 3D from its beginning, or the user views the program in 2D after the user has completed the preparation for 3D viewing, according to the result of the user selection.

A method for displaying only a specific video and audio without displaying the video and audio of the program until the user completes the preparation for 3D viewing will now be described. This is conducted considering, for example, the case where a program has started in a state in which the user has not completed the preparation for 3D viewing and the user does not desire to view contents until the preparation is completed (because a result is known in, for example, a sports relay broadcast).

Figure 41:
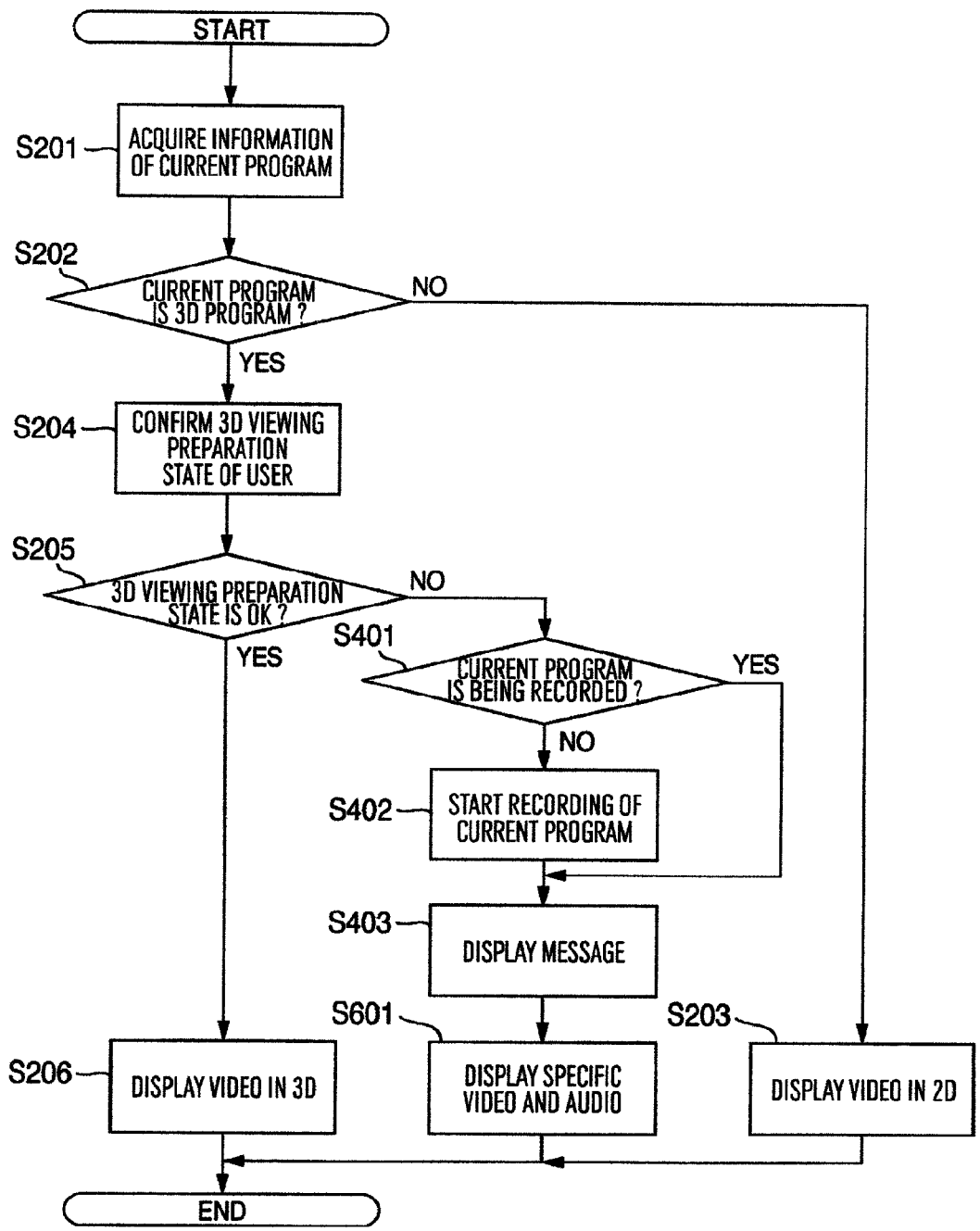
FIG. 41 shows an example of a flow chart of a system controller after start of a program.

A flow of processing executed by the system controller 51 when a 3D program is started in that case is shown in FIG. 41. The processing flow differs from the processing flow shown in FIG. 36 in that a step (S601) for displaying a specific video and audio after the message is displayed at S403 is added.

As for the specific video and audio, for example, a message for prompting the 3D preparation, a black screen, or a still picture of the program is mentioned, and silence or music (environmental music) of a fixed pattern is mentioned.

The display of a fixed pattern video (a message, an environmental video, a 3D video, or the like) can be implemented by reading out data from the inside of the video decoder device 30, a ROM which is not illustrated, or the recording medium 26, decoding the data in the video decoder device 30, and outputting the decoded data from the video decoder device 30. The output of the black screen can be implemented by, for example, outputting a video of only a signal which represents the black color from the video decoder device 30 or outputting mute of an output signal or a black video from the screen configuration control device 32.

The fixed pattern audio (silence or environmental music) can be implemented by reading out data from the inside of the audio decoder device 31, a ROM, or the recording medium 26, decoding the data, and outputting the decoded data, or muting the output signal in the same way.

Outputting a still picture of the program video can be implemented the system controller 51 which instructs the recording/reproducing controller 58 to temporarily stop the program reproduction and the video. After the user selection is executed, processing of the system controller 51 is executed in the same way as the foregoing description as shown in FIG. 38.

As a result, it becomes possible to prevent the video or audio of the program from being output until the user completes the 3D viewing preparation.

Also in the case where program information of the current program is changed such as the case where the user conducts the station selection operation and changes the CH, the processing flow shown in FIG. 36 or FIG. 41 is executed by the system controller 51. In this case as well, processing similar to that described above is conducted.

In the case where the program has changed over, therefore, a viewing program other than a 3D program is displayed in 2D. If the user has completed the 3D viewing preparation, the video is changed over to 3D display. Unless the user has completed the 3D viewing preparation, recording of the current program is executed, the message shown in FIG. 37 or 39 is displayed and it becomes possible to select a subsequent operation. Such an effect is brought about.

As for the recording operation of the 3D program, more power is dissipated as compared with the typical case or the operation load obstructs the user operation in some cases. In such a case, it becomes possible to set to prevent a 3D program from being automatically recorded by user's previous setting.

Figure 42:
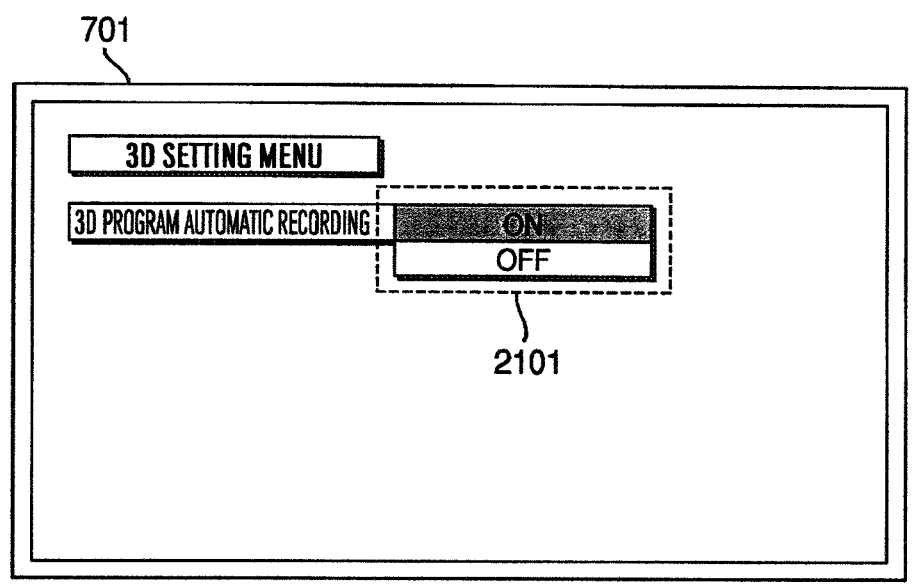
FIG. 42 shows an example of message display.

An example of user setting screen is shown in FIG. 42. This is a user menu for setting whether to conduct automatic recording of a 3D program. Reference numeral 2101 denotes a selectable button. If the user selects "OFF," it becomes possible to prevent the 3D program from being automatically recorded. If the user sets "OFF" on this screen, the user instruction receiver 52 gives a notice of "OFF" of the "3D program automatic recording" which is set by the user, to the system controller 51.

Figure 43:
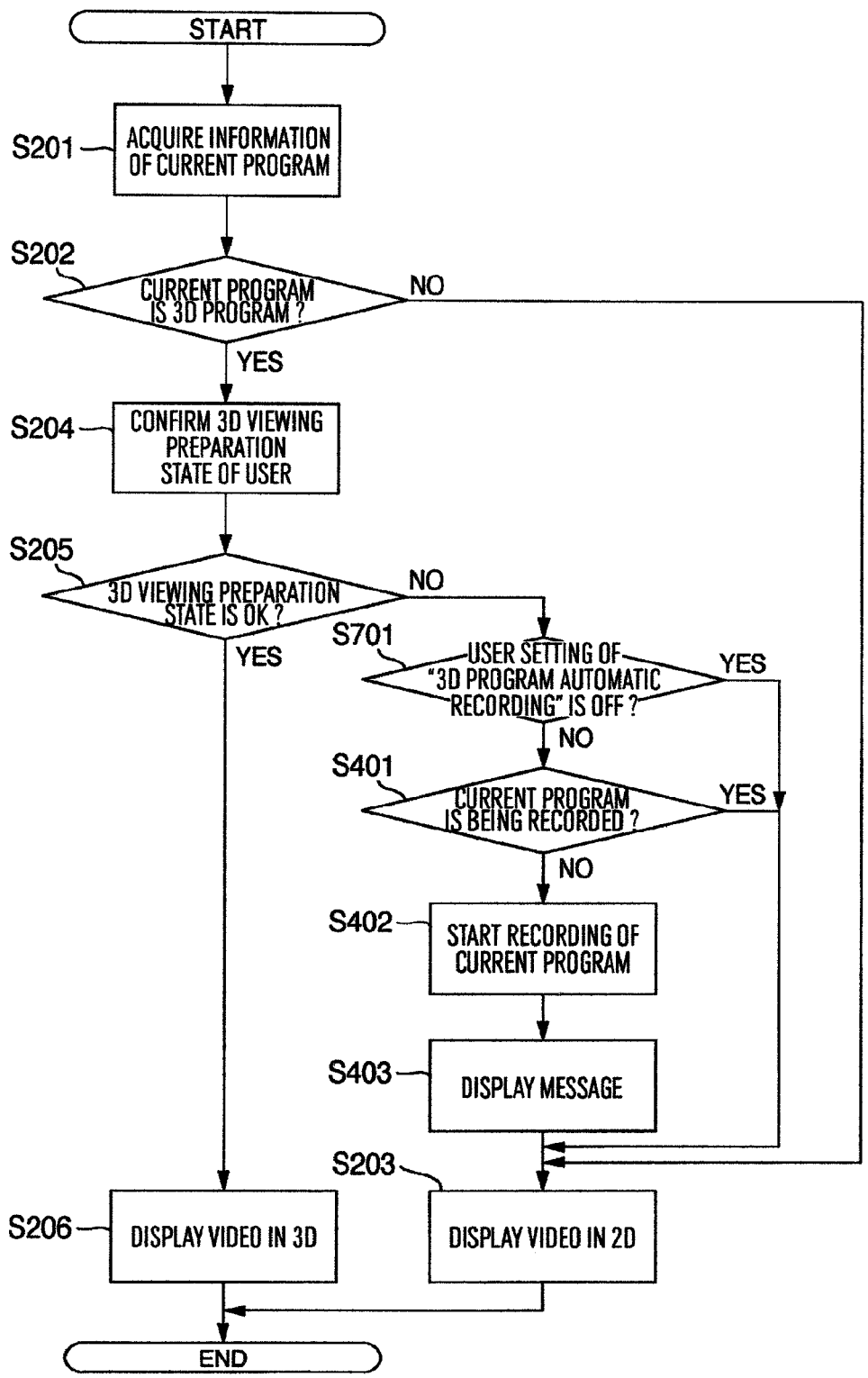
FIG. 43 shows an example of a flow chart of a system controller after start of a program.

A flow chart of the system controller 51 corresponding to the setting in the user menu described with reference to FIG. 42 is shown in FIG. 43. The flow chart shown in FIG. 43 differs from the flow charts shown in FIGS. 36 and 41 in the following points. Unless the user's preparation for 3D is OK (no at S205), the user setting state of the 3D program automatic recording is checked. If the user setting of the "3D program automatic recording" is OFF (yes at S701), recording processing at S402 is not conducted.

Unless the user desires, it becomes possible in this case to prevent 3D program from being automatically recorded, suppress the power dissipation, and prevent unnecessary operations from being conducted.

A method for determining whether reproduced contents are a 3D program, checking the 3D preparation state of the user, and conducting processing when reproduction from the recording medium is started will now be described. An example of a processing flow of the system controller 51 at the time of reproduction start is shown in FIG. 44.

Figure 44:
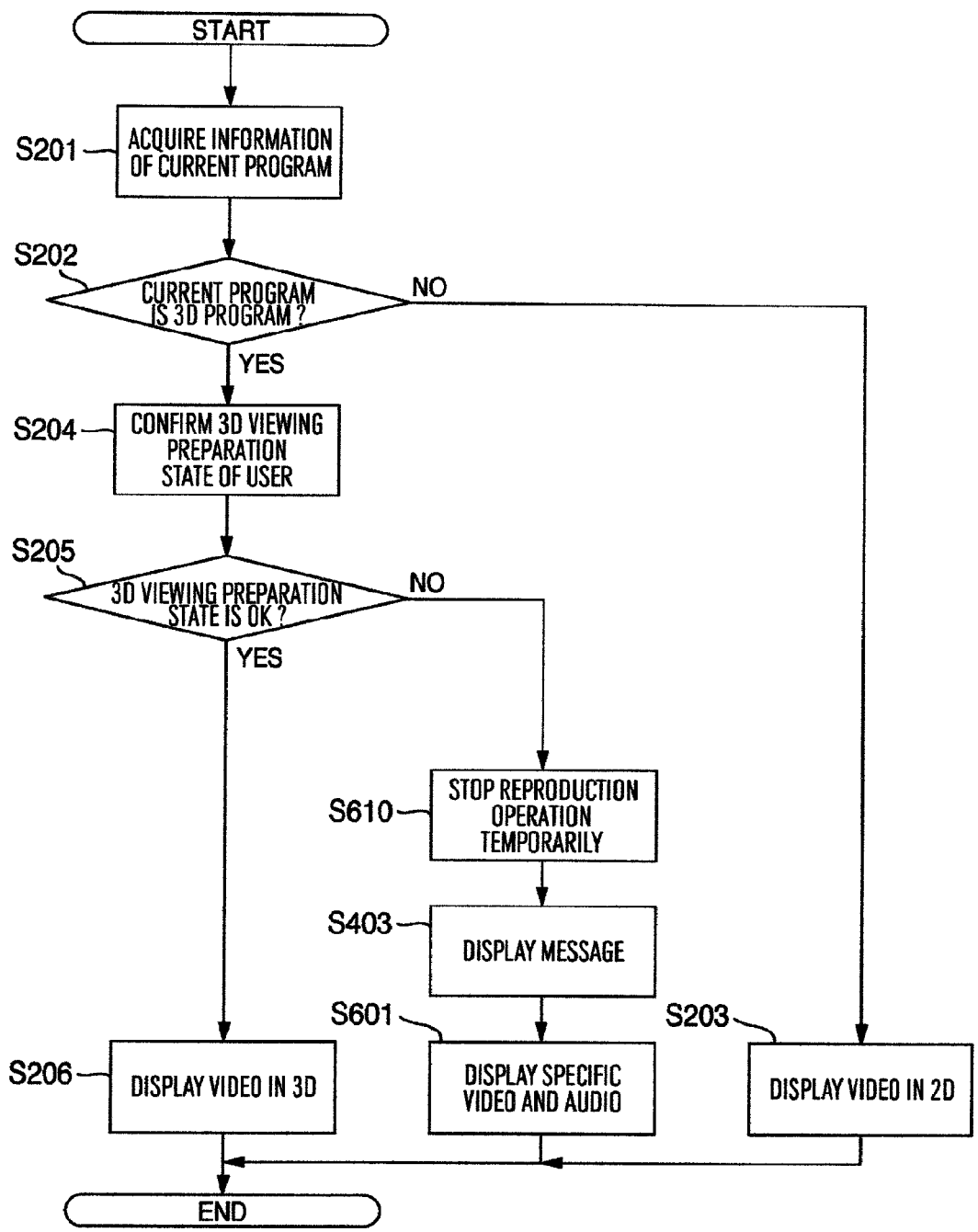
FIG. 44 shows an example of a flow chart of a system controller after start of a program.

The processing flow shown in FIG. 44 differs from the above-described processing in that there isn't the processing before the program start (FIG. 35), there aren't the current program recording judgment (S401 in FIGS. 36, 41 and 43) and recording processing (S402 in FIGS. 36, 41 and 43), and reproduction temporary stop processing (S610) is added.

The processing flow shown in FIG. 44 is similar to the processing shown in FIG. 36 until judgment of the 3D viewing preparation state is conducted (S205). Thereafter, if the 3D viewing preparation state is NG (no at S205), the system controller 51 instructs the recording/reproducing controller 58 to temporarily stop the reproduction operation (S610). Then, message display as shown in FIG. 37 is conducted (S403), and a specific video and audio is displayed according to a method similar to that in the processing described with reference to S601 in FIG. 41 (S601).

Figure 45:
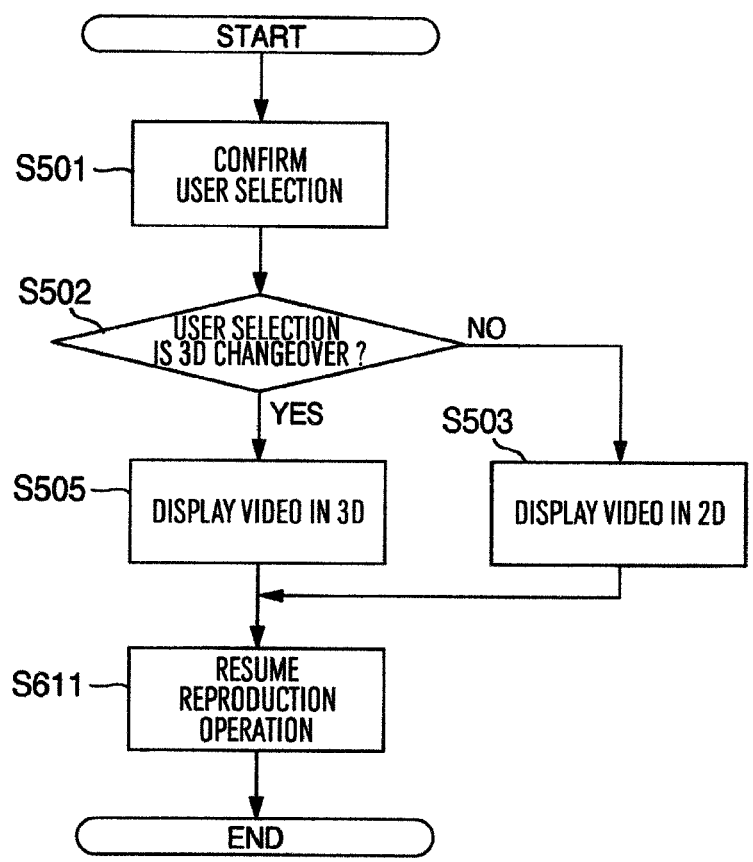
FIG. 45 shows an example of a flow chart of a system controller after user's selection.

A flow of processing executed by the system controller 51 after the user has conducted the selection is shown in FIG. 45. The system controller 51 acquires a result of the user selection from the user instruction receiver 52 (S501). Unless the user selection is "3D changeover" (no at S502), the system controller 51 conducts 2D display of a video (S503).

If the user selection is "3D changeover" (yes at S502), the system controller 51 conducts 3D display of a video (S505). Then, the system controller 51 instructs the recording/reproducing controller 58 to resume the temporarily stopped reproduction operation (S611).

At the time of reproduction from the recording medium, a viewing program other than a 3D program is displayed in 2D in this way. If the user has completed the 3D viewing preparation, the video is changed over to 3D display. Unless the user has completed the 3D viewing preparation, reproduction is stopped temporarily, the message shown in FIG. 37 is displayed, and it becomes possible to select a subsequent operation. After the user has selected an operation, a program is reproduced in video display conformed to the user selection. In the case of reproduction operation, the reproduction operation is stopped temporarily until the user completes the 3D preparation. This brings about an effect that wasteful reproduction operation is not conducted and power saving can be implemented.

Figure 46:
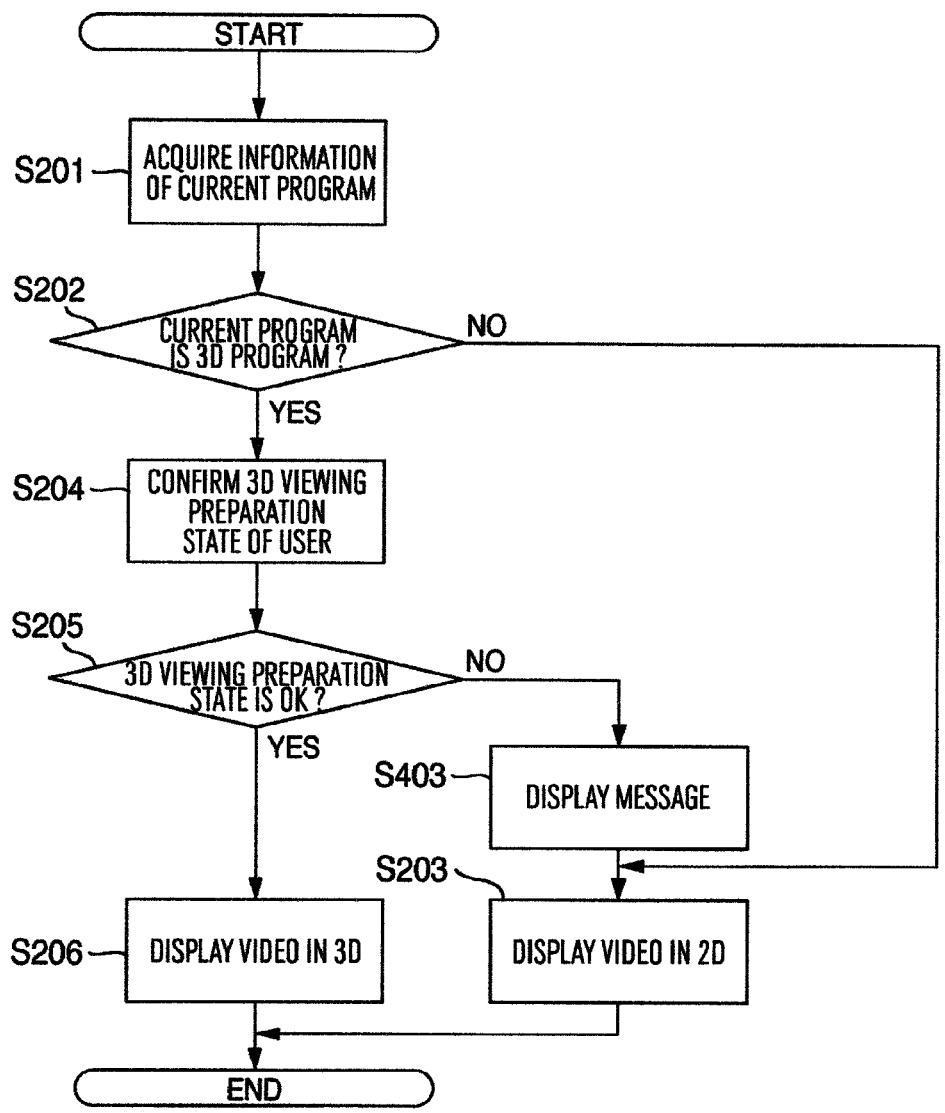
FIG. 46 shows an example of a flow chart of a system controller after start of a program.

It is supposed that the current program is a 3D program as a result of program changeover conducted by station selection or the like. If the 3D viewing preparation state of the user is OK, a 3D video is displayed. Unless the 3D viewing preparation state of the user is OK, a message is displayed to prompt 3D viewing preparation. Such an example will now be described. A processing flow of the system controller 51 in this case is shown in FIG. 46.

This processing flow is executed when program information of the current program is changed by, for example, station selection or power on. The processing flow is similar to that shown in FIG. 32 or FIG. 36 until the 3D viewing preparation state is judged (S201, S202, S204 and S205).

Then, unless the 3D viewing preparation state is OK (no at S205), the system controller 51 displays a message to notify the user that a 3D program has started and urge the user to select a subsequent operation as shown in FIG. 37 (S403), changes over the video to 2D display (S203), and finishes the processing.

As for an example of user selection judgment method in screen display shown in FIG. 37, if the user operates a remote controller and depresses the <3D> button on the remote controller or if the user puts the cursor upon "OK/3D" on the screen and depresses the <OK> button on the remote controller, the user selection is judged to be "3D changeover."

Or if the user depresses the <cancel> button or the <return> button on the remote controller, or if the user puts the cursor upon "cancel" on the screen and depresses the <OK> on the remote controller, then user selection is judged to be "other than 3D changeover."

Besides this, if, for example, an operation which brings the 3D viewing preparation state to OK (such as wearing of 3D glasses), the user selection may be judged to be "3D changeover."

Figure 47:
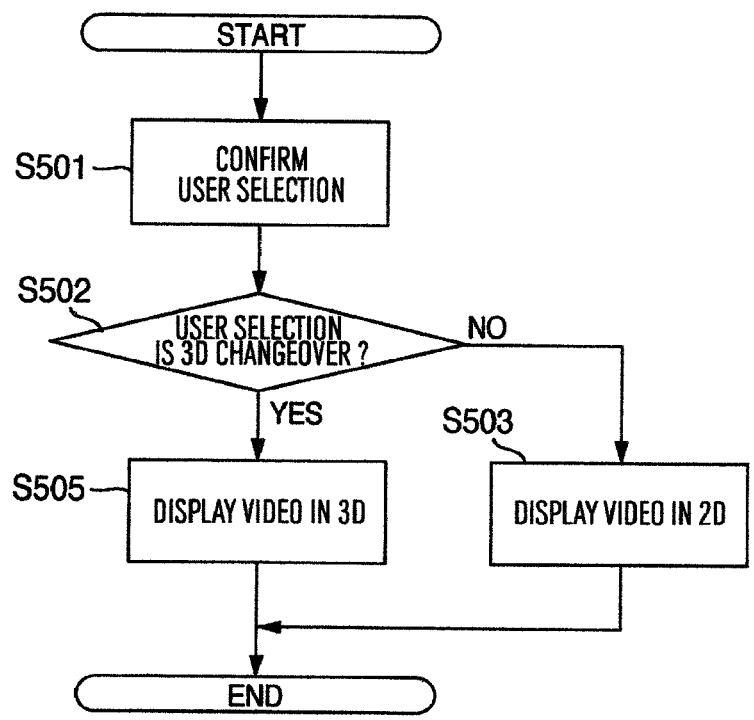
FIG. 47 shows an example of a flow chart of a system controller after user's selection.

A flow of processing executed by the system controller 51 after the user has conducted the selection is shown in FIG. 47. The system controller 51 acquires information representing what is selected from the menu display by the user, from the user instruction receiver 52 (S501). Unless the user selection is "3D changeover" (no at S502), the system controller 51 conducts 2D display of a video (S503), and finishes the processing. If the user selection is "3D changeover" (yes at S502), the system controller 51 conducts 3D display of a video (S505) and finishes the processing.

In the case where the current program is a 3D program as a result of program changeover conducted by user's station selection or the like, it becomes possible in this way to display a 3D video if the 3D viewing preparation state of the user is OK, display a 2D video and a message unless the 3D viewing preparation state of the user is OK, and change over to a 3D video easily after the user's 3D viewing preparation is completed. Furthermore, the user can easily know that the current program is s 3D program. Furthermore, when the 3D viewing preparation state of the user is already OK, it is possible to prevent the 2D video from being changed over unnecessarily, a message from being displayed, and view the 3D program instantly.

In this example, a recorder is not used. Therefore, this example is useful in, for example, the case where a recorder cannot be used (such as, for example, the case where resources are insufficient because another program is being recorded or a recorder is not included). For example, it is desirable to use this example in the case where recording operation is impossible in the processing flow described with reference to FIG. 36 or FIG. 41.

According to the embodiment described heretofore, the user can previously complete 3D viewing preparation with respect to a start portion of a 3D program. Or if the 3D viewing preparation is not completed before the start of the 3D program, a recording and reproducing function is used and video display is conducted again after the user has completed preparation for viewing the 3D program. In this way, it becomes possible for the user to view a 3D program in a better state. Furthermore, the video display is automatically changed over to a display method which is considered to be desirable to the user (for example, changeover to the 3D video display is conducted when the user desires to view a 3D video or vice versa). In this way, convenience to the user can be improved. Similar effects can also be anticipated in the case where changeover to a 3D program is conducted due to station selection or in the case where reproduction of a recorded 3D program is started.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A display apparatus comprising:
    a network interface configured to receive video content and content information including information which identifies whether video content to be transmitted for next viewing by a viewer includes 3D video content or not;
    a video processing unit configured to change video processing of video content, and
    a display unit configured to display video content in 3D view or in 2D view, wherein,
    in case that the received content information indicates that the video content to be transmitted for next viewing includes 3D video content, the display unit is configured to display an indication indicating the video content to be transmitted for next viewing includes 3D video content, and requesting viewer-determination of whether the video content to be transmitted for next viewing is to be displayed in 3D view or in 2D view, and
    the video processing unit configured to change video processing of the video content to be viewed next in accordance with the viewer-determination.

2. The display apparatus according to claim 1, further comprising an operation instruction receiving unit configured to receive an operation instruction signal responding to the viewer-determination, wherein the video processing unit is configured to change the video processing of the video content to be transmitted for next viewing in accordance with the operation instruction signal.

3. The display apparatus according to claim 1, wherein the content information further comprises information which identifies a 3D method of the video content to be transmitted for next viewing, and the video processing unit is configured to conduct 3D video processing, if the display unit is capable of displaying a 3D video content by a 3D method indicated by the content information.

4. A video processing method comprising:

receiving content information including information which identifies whether a video content to be transmitted for next viewing by a viewer includes a 3D video content or not;

displaying an indication informing the video content to be transmitted for next viewing includes a 3D video content, and requesting viewer-determination of whether the video content to be transmitted for next viewing is to be displayed in 3D view or in 2D view, in a case that the content information indicating that the video content to be transmitted for next viewing includes a 3D video content;

receiving an operation instruction signal responding to the viewer-determination;

displaying the video content processed by video processing in accordance with the operation instruction signal.

5. A video processing method in an display apparatus which displays video content on a display unit, the video processing method comprising:

receiving content information including information which identifies whether a video content to be transmitted for next viewing by a viewer includes 3D video content or not and information which identifies a 3D method of the video content;

displaying an indication indicating the video content to be transmitted for next viewing includes 3D video content, and requesting viewer-determination of whether the video content to be transmitted for next viewing is to be displayed in 3D view or in 2D view, in a case that the content information indicating that the video content to be transmitted for next viewing includes 3D video content;

receiving an operation instruction signal responding to the viewer-determination;

displaying the video content processed by 3D video processing, if the operation instruction signal instructing the video content to be viewed in 3D view and the display unit is capable of displaying a 3D video content by a 3D method identified in the content information.

* * * * *